(12) United States Patent
Tsiberidis

(10) Patent No.: US 11,390,126 B2
(45) Date of Patent: Jul. 19, 2022

(54) COMPRESSOR ASSEMBLY COMPRISING RADIAL PISTONS

(71) Applicants: ILLINOIS TOOL WORKS INC., Glenview, IL (US); KT PROJEKTENTWICKLUNGS-GMBH, Heilbronn (DE)

(72) Inventor: Konstantin Tsiberidis, Untergruppenbach (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 342 days.

(21) Appl. No.: 16/463,287

(22) PCT Filed: Nov. 24, 2017

(86) PCT No.: PCT/EP2017/080385
§ 371 (c)(1),
(2) Date: May 22, 2019

(87) PCT Pub. No.: WO2018/096109
PCT Pub. Date: Mar. 31, 2018

(65) Prior Publication Data
US 2019/0308472 A1    Oct. 10, 2019

(30) Foreign Application Priority Data

Nov. 24, 2016   (DE) ...................... 10 2016 122 738.2

(51) Int. Cl.
*B60C 23/12* (2006.01)
(52) U.S. Cl.
CPC .......... *B60C 23/127* (2020.05); *B60C 23/137* (2020.05)

(58) Field of Classification Search
CPC ...... B60C 23/127; B60C 23/137; B60C 23/12
See application file for complete search history.

(56) References Cited

U.S. PATENT DOCUMENTS

| 648,408 A | 5/1900 | Hayes |
| 652,997 A | 7/1900 | Crandall |
| (Continued) | | |

FOREIGN PATENT DOCUMENTS

| CA | 2226493 | 7/1996 |
| CN | 85105176 A | 12/1986 |
| (Continued) | | |

OTHER PUBLICATIONS

European Patent Office (EPO), International Search Report, Form PCT/ISA/210 for International Application No. PCT/EP2017/080385 (2 pages).

(Continued)

*Primary Examiner* — Kip T Kotter
(74) *Attorney, Agent, or Firm* — Pauley Erickson & Swanson

(57) ABSTRACT

A compressor assembly for supplying pressure medium to a tire cavity of a vehicle wheel that can be mounted on a wheel hub which is mounted on a wheel carrier so as to be rotatable about an axis of rotation. A transmission, preferably a cam mechanism, is equipped, through a cooperation of a wheel mount-side transmission part with a hub-side transmission part, to convert a rotary movement between the wheel mount side and the wheel hub side into an oscillating translatory movement of the compressor component, with the translatory movement of the compressor component extending at least partially, preferably entirely, in a radial direction that is oriented orthogonally to the axis of rotation.

27 Claims, 31 Drawing Sheets

(56) References Cited

U.S. PATENT DOCUMENTS

| | | | |
|---|---|---|---|
| 655,797 A | 8/1900 | Reason | |
| 797,447 A | 8/1905 | Merry | |
| 1,358,524 A | 11/1920 | Cooper | |
| 1,713,899 A | 5/1929 | Gray | |
| 2,317,636 A | 4/1943 | Parker | |
| 2,506,677 A * | 5/1950 | McKenna | B60C 23/137 152/422 |
| 5,052,456 A | 10/1991 | Dosjoub | |
| 5,325,902 A | 7/1994 | Loewe et al. | |
| 5,342,177 A | 8/1994 | Cheng | |
| 5,505,080 A | 4/1996 | McGhee | |
| 5,591,281 A * | 1/1997 | Loewe | B60C 23/137 152/418 |
| 6,345,650 B1 | 2/2002 | Paasch et al. | |
| 6,736,170 B2 | 5/2004 | Eriksen et al. | |
| 6,994,136 B2 | 2/2006 | Stanczak | |
| 7,237,590 B2 | 7/2007 | Loewe | |
| 7,581,576 B2 | 9/2009 | Nakano | |
| 7,760,079 B2 | 7/2010 | Isono | |
| 7,891,393 B1 | 2/2011 | Czarno | |
| 8,052,400 B2 * | 11/2011 | Isono | B60C 23/00354 417/233 |
| 9,151,288 B2 | 10/2015 | Richardson et al. | |
| 9,457,772 B2 | 10/2016 | Paasch | |
| 2003/0056851 A1 | 3/2003 | Eriksen et al. | |
| 2007/0151648 A1 | 7/2007 | Loewe | |
| 2008/0060734 A1 | 3/2008 | Stehle | |
| 2008/0190535 A1 | 8/2008 | Concu | |
| 2010/0059143 A1 | 3/2010 | Wang | |
| 2010/0282388 A1 | 11/2010 | Kelly | |
| 2013/0251552 A1 | 9/2013 | Richardson | |
| 2013/0269514 A1 | 10/2013 | Sato et al. | |
| 2014/0096881 A1 | 4/2014 | Loewe | |
| 2015/0101723 A1 | 4/2015 | Keeney et al. | |
| 2015/0191058 A1 | 7/2015 | van Wyk Becker et al. | |
| 2016/0107491 A1 * | 4/2016 | Lin | B60S 5/043 141/4 |
| 2016/0250902 A1 | 9/2016 | Becker | |
| 2016/0288591 A1 | 10/2016 | Becker | |
| 2016/0288592 A1 | 10/2016 | Becker | |
| 2017/0072752 A1 * | 3/2017 | Lin | F04B 27/0404 |
| 2017/0113500 A1 | 4/2017 | Gau et al. | |
| 2019/0023091 A1 | 1/2019 | Spindler et al. | |
| 2019/0308472 A1 | 10/2019 | Tsiberidis | |
| 2019/0366785 A1 | 12/2019 | Tsiberidis | |
| 2020/0055351 A1 | 2/2020 | Tsiberidis | |
| 2020/0070450 A1 | 3/2020 | Tsiberidis | |

FOREIGN PATENT DOCUMENTS

| | | | | |
|---|---|---|---|---|
| CN | 86105562 A | 2/1988 | | |
| CN | 2126829 Y | 10/1993 | | |
| CN | 2188661 Y | 2/1995 | | |
| CN | 2202665 Y | 7/1995 | | |
| CN | 2252128 | 4/1997 | | |
| CN | 101104374 | 1/2008 | | |
| CN | 101120170 A | 2/2008 | | |
| CN | 201061989 Y | 5/2008 | | |
| CN | 201082666 | 7/2008 | | |
| CN | 101312821 A | 11/2008 | | |
| CN | 101313162 A | 11/2008 | | |
| CN | 101351347 A | 1/2009 | | |
| CN | 101696681 | 4/2010 | | |
| CN | 202439521 U | 9/2012 | | |
| CN | 102781653 A | 11/2012 | | |
| CN | 102791954 A | 11/2012 | | |
| CN | 103459843 A | 12/2013 | | |
| CN | 103465736 A | 12/2013 | | |
| CN | 104024007 A | 9/2014 | | |
| CN | 104583592 A | 4/2015 | | |
| CN | 105264228 A | 1/2016 | | |
| CN | 205044451 U | 2/2016 | | |
| CN | 105408135 A | 3/2016 | | |
| DE | 40 36 362 A1 | 5/1992 | | |
| DE | 41 33 039 A1 | 4/1993 | | |
| DE | 10 2005 019 766 A1 | 11/2006 | | |
| DE | 20 2014 010 520 U1 | 12/2015 | | |
| DE | 10 2015 115 642 A1 | 3/2017 | | |
| EP | 0166123 | 1/1986 | | |
| EP | 0 588 595 A1 | 3/1994 | | |
| EP | 1 881 197 A1 | 1/2008 | | |
| EP | 2 828 103 B1 | 1/2015 | | |
| FR | 1324352 | 3/1963 | | |
| JP | H11139118 A | 5/1999 | | |
| JP | 2004-114908 | 4/2004 | | |
| JP | 2004-136797 | 5/2004 | | |
| JP | 2006-110762 | 4/2006 | | |
| JP | 2007-039013 A | 2/2007 | | |
| JP | 2007-278796 | 10/2007 | | |
| JP | 2008-030723 | 2/2008 | | |
| WO | WO 2008/041423 A1 | 4/2008 | | |
| WO | WO 2010/146373 A1 | 12/2010 | | |
| WO | WO-2014009822 A1 * | 1/2014 | | B60C 23/127 |
| WO | WO 2015/063679 A1 | 5/2015 | | |
| WO | WO 2015/075655 A1 | 5/2015 | | |
| WO | WO 2016/138972 A1 | 9/2016 | | |
| WO | WO 2016/178137 A1 | 11/2016 | | |
| WO | WO 2018/096108 A1 | 5/2018 | | |
| WO | WO 2018/096110 A1 | 5/2018 | | |
| WO | WO 2018/096111 A1 | 5/2018 | | |
| WO | WO 2018/096112 A1 | 5/2018 | | |

OTHER PUBLICATIONS

Chongfeng Di, "Research on Characteristic and Control Strategy of Hydraulic Hybrid Vehicle with Hydraulic Common Pressure Rail", China Master Dissertation Full-text Database, Jan. 1, 2016, pp. 27-38 and 78-80.

* cited by examiner

Fig. 12
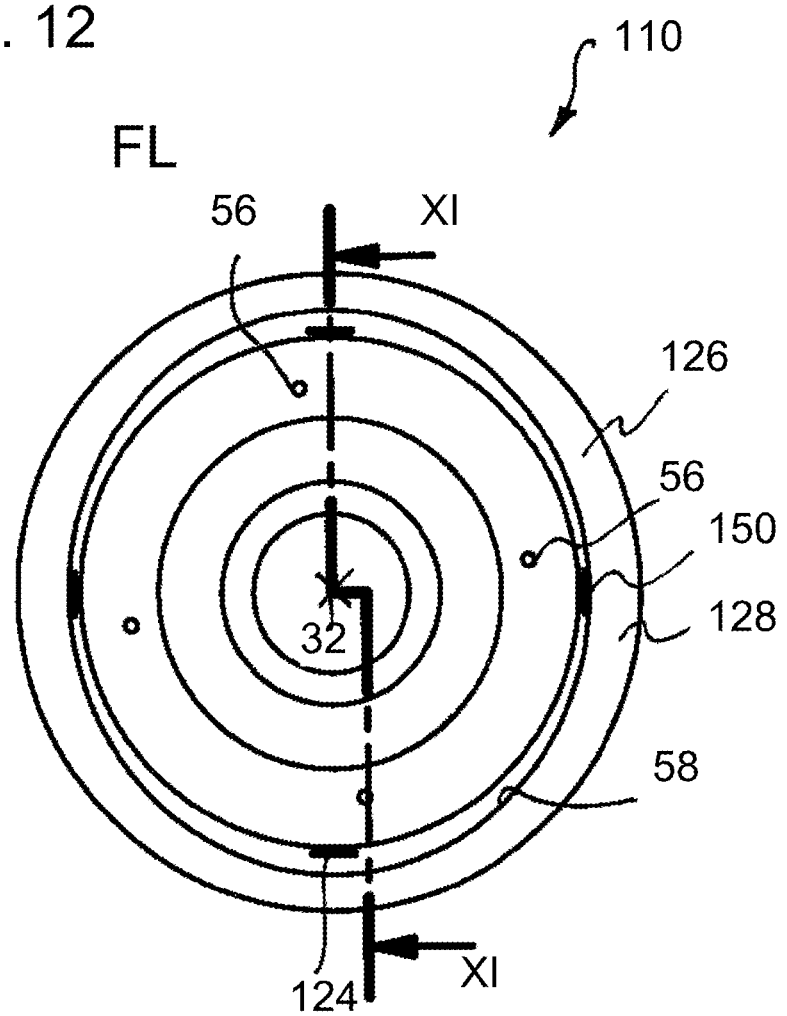
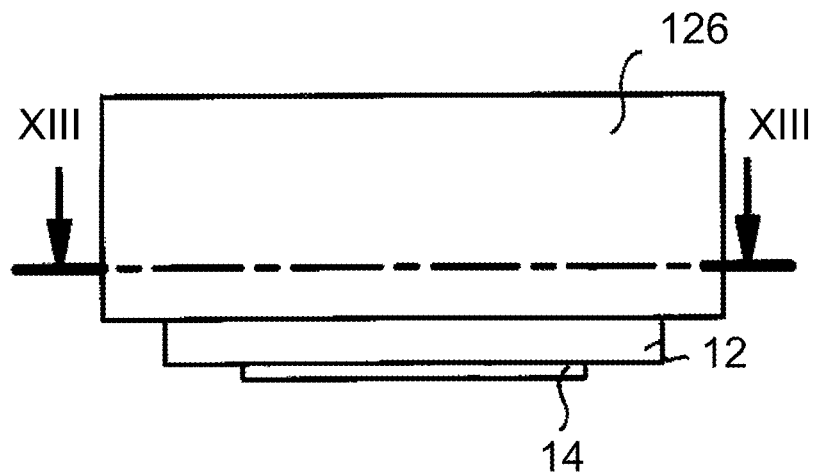

COMPRESSOR ASSEMBLY COMPRISING RADIAL PISTONS

BACKGROUND OF THE INVENTION

Field of the Invention

The invention relates to a compressor assembly for supplying pressure fluid to a tire cavity of a tire of a vehicle wheel that can be mounted on a wheel hub according to the preamble to claim 1.

Discussion of Related Art

The tire cavity of the tire is thus part of a vehicle wheel that can be mounted on a wheel hub, said wheel hub being supported on a wheel mount so that it is able to rotate around an axis of rotation.

In order to fill a tire cavity of a vehicle tire with a pressure fluid such as compressed air, it is known to provide a tire valve on the vehicle wheel via which the pressure fluid can be dispensed into the tire cavity. In vehicles such as passenger vehicles, trucks, or commercial vehicles, tire valves are usually positioned in the region of a rim on which the tire is mounted so that they are easily accessible from the outside.

A pressure fluid source external to the vehicle can be connected to the tire valve, for example by means of a hose line, in order to thus be able to check the tire pressure, in particular manually, and correct it as needed.

There are also known vehicle-mounted pressure fluid supply systems, which make it possible to fill the tire cavity of a vehicle tire with pressure fluid in an autonomous fashion. To accomplish this, it is known to provide pressure fluid lines from a central pressure fluid source provided in the vehicle, for example a compressor or a pressure reservoir, to the wheels and to route them into the tire cavity. At the transition from components that are rotationally fixed relative to the vehicle such as the wheel mount to the wheels that rotate during driving, so-called rotary unions are provided, which permit a filling with pressure fluid even during driving, i.e. when the wheels are rotating. It is thus possible to adjust the tire pressure e.g. to altered load circumstances, road surfaces, and ambient temperatures or to compensate for leaks, for example due to diffusion.

One problem of the known systems is that with pressure fluid sources external to the vehicle, it is necessary to stop and laboriously check the pressure in all of the tire cavities. In the known vehicle-mounted pressure fluid sources that supply pressure fluid to the tire cavity via rotary unions, the operational reliability of the rotary unions for the pressure fluid is a problem. Producing the rotary unions so that they are rugged and long-lived enough to last the life of a vehicle is only possible with a great deal of effort, which is expensive and uneconomical.

SUMMARY OF THE INVENTION

The object of the present invention is to create a compressor assembly, which ensures a filling of the tire cavity with pressure fluid in a way that is reliable and low-maintenance and lasts the entire life of a vehicle.

Preferably, the compressor assembly here functions in an automated fashion. In this case, automated is understood to mean that it is not necessary to stop and use a pressure fluid source external to the vehicle. The operation of the compressor assembly according to the invention, however, can also start autonomously, i.e. by means of an arbitrarily embodied regulating or control system in the vehicle, or in response to a control signal issued by the vehicle's driver.

This object is attained by means of a compressor assembly according to the invention, characterized in that the compressor assembly comprises at least one hub-side compression chamber whose volume can be changed through a translatory movement of a compressor component; a pressure fluid that is to be conveyed into the tire cavity can be pressurized through a volume reduction of the compression chamber; and the compressor assembly comprises a transmission, preferably a cam mechanism, which is equipped, through a cooperation of a wheel mount-side transmission part with a hub-side transmission part, to convert a rotary movement between the wheel mount side and the wheel hub side into an oscillating translatory movement of the compressor component, with the translatory movement of the compressor component extending at least partially, preferably entirely, in a radial direction that is oriented orthogonally to the axis of rotation.

A compressor assembly of this kind has the advantage that because its design, which is possible for purely mechanical reasons, it can be embodied in a particularly rugged way. Through the hub-side positioning of the compression chamber, the pressurized pressure fluid is prepared directly in the rotating part of the vehicle wheel so that a rotary union for the pressure fluid is not needed. In other words, the pressure fluid is prepared directly in the place of use, i.e. in the rotating tire cavity.

Rotary unions for pressure fluid are difficult to design and producing them so that they are reliable and functional over the long term is technically demanding. The implementation of such pressure fluid rotary unions is also complicated by the adverse circumstances in the region of the vehicle wheel since intense contamination and intermittent loads must be expected in this region. The compressor assembly according to the invention makes it possible, while the vehicle in which the compressor assembly is installed is being driven, to continuously supply pressure fluid at a sufficient pressure and thus to ensure an always sufficient filling of the tire.

Since the translatory movement of the compressor component extends at least partially in the radial direction, the compressor assembly can be embodied in a particularly space-saving way with a large volume of the compression chamber.

In the context of the present application, the hub side and hub-side components are understood to be those components, which are positioned so that they are rotationally coupled to the wheel hub. Such components are thus directly or indirectly connected to the wheel hub in such a way that they rotate with the wheel hub when the wheel hub rotates relative to the wheel mount. The wheel mount is affixed to the vehicle. The wheel mount side and wheel mount-side components are therefore rotationally fixed relative to the wheel mount. With a rotation of the wheel or more precisely, the wheel hub, a rotary relative movement therefore occurs between the wheel mount-side components such as the passenger compartment of the vehicle and the wheel or more precisely, the tire, the wheel hub, and the other hub-side components.

When installed on the vehicle, the wheel mount-side transmission part is thus connected to the wheel mount-side components in a completely rotationally fixed manner. In other words, no part of the wheel mount-side transmission part rotates as the vehicle is driven. Only the hub-side transmission components rotate; in particular, the hub-side transmission part rotates fully around the axis of rotation.

The hub-side transmission part is thus always rotationally coupled to the hub-side components that rotate as the vehicle is driven. The wheel mount-side transmission part, at least when the compressor assemblies are in operation, but preferably always, is rotationally fixed to the vehicle or more precisely to the wheel mount-side components.

Preferably, the wheel mount-side transmission part is positioned in an entirely fixed and immobile fashion, i.e. does not move in either rotary or translatory fashion relative to the wheel mount side.

Preferably, one of the compressor assemblies according to the invention is positioned on each wheel of a vehicle so that all of the wheels of the vehicle are always each supplied with sufficient pressure in their respective tire cavity. Since each wheel comprises its own pressure fluid supply, rotary unions for supplying pressure fluid are superfluous.

Another subject of the present invention is a vehicle in which the above-described compressor assembly is installed.

The wheel mount-side transmission part advantageously comprises a disk cam and/or a grooved disk cam and/or a beaded disk cam. By means of this, the rotary relative movement between the wheel mount-side transmission part and the hub-side transmission part can be advantageously converted into the translatory movement of the compressor component.

In the present case, a disk cam is understood to be a component that is embodied as disk-like and has an outer contour or inner contour, the outer contour or inner contour having a curve extending around the axis of rotation that deviates from the curve of a circular path extending concentrically around the axis of rotation.

In this connection, a grooved disk cam is understood to be a disk-like element that has a groove, this groove having a curve around the axis of rotation that deviates from the curve of a circular path extending concentrically around the axis of rotation.

A beaded disk cam refers to an element in which a disk-like element comprises a bead, the bead having a curve around the axis of rotation that deviates from the curve of a circular path extending concentrically around the axis of rotation.

By means of the above-mentioned embodiments, a wheel mount-side transmission part can be embodied in an advantageous, reliably functioning, and space-saving way.

It is also preferable if the hub-side transmission part comprises a plunger output element. This makes it possible, in a simple and space-saving design, to implement an output element of the transmission on the hub side.

In this connection, it is particularly preferable if the plunger output element can be driven by means of an inner contour of the disk cam. Since in this embodiment variant, the plunger output element is positioned extending from the inner contour toward the axis of rotation, the above-described embodiment is also embodied in a particularly space-saving way.

Alternatively to this, it is also in keeping with the spirit of the invention if the plunger output element can be driven by means of an outer contour of the disk cam. By means of this, the wheel mount-side transmission part can be embodied in a particularly space-saving way and large compression chambers can be provided, which ensures a high delivery capacity of the compressor assembly.

It is also preferable if, viewed in the radial direction, the plunger output element has a linear guide situated between the axis of rotation and a contact point with the disk cam, the grooved disk cam, and/or the beaded disk cam. Such a support of the plunger output element enables a compact design of the compressor assembly in the radial direction.

It is also advantageous if, viewed in the radial direction, the contact point of the plunger output element with the disk cam, the grooved disk cam, and/or the beaded disk cam lies between the axis of rotation and the linear guide of the plunger output element. By means of this, the contact point of the plunger output element can be provided close to the axis of rotation and by means of this, the dimensions of the wheel mount-side transmission part can be minimized.

In a preferred embodiment, the compressor component is embodied of one piece with the hub-side transmission part. By means of this, the force absorbed by the hub-side transmission part can be converted directly into the compression of the pressure fluid. This also constitutes an embodiment that requires few components and therefore has a low susceptibility to malfunction.

The compressor assembly is advantageously embodied in such a way that it comprises a coupling device by means of which the hub-side transmission part can be brought into cooperation with the wheel mount-side transmission part. As a result, the operation of the compressor assembly can be started and stopped depending on the situation. It is thus possible to operate the compressor assembly only when the pressure in the tire cavity to be filled falls below a set point. The compressor assembly can then be operated until the set point is reached and can then be switched off or disengaged.

In this case, it is particularly preferable if the coupling device can be pneumatically, magnetically, electrically, or electromechanically actuated, preferably comprises a hub-side coupling element that can be switched, preferably pneumatically, magnetically, electrically, or electromechanically, from a locked position into a release position; the hub-side transmission part cooperates with the wheel mount-side transmission part when the coupling element is in the release position and the hub-side transmission part is prevented from cooperating with the wheel mount-side transmission part when the coupling element is in the locked position. A cooperation between the hub-side transmission part and the wheel mount-side transmission part can thus be efficiently switched by means of the coupling element.

It is particularly advantageous if the hub-side coupling element is prestressed into the locked position, particularly by means of a spring. A cooperation of the hub-side transmission part and the wheel mount-side transmission part is thus prevented in the normal state. As a result, no unneeded energy is consumed during normal driving operation. It is thus possible for the hub-side transmission part to be brought into cooperation with the wheel mount-side transmission part via the coupling device—or more precisely, the coupling element—only when needed.

It is advantageous if the hub-side transmission part is prestressed into a position in which it cooperates with the wheel mount-side transmission part. A control pulse at the coupling device is therefore sufficient and the hub-side transmission part comes into cooperation with the wheel mount-side transmission part.

It is also advantageous if the hub-side coupling element comprises a locking section, which in the locked position rests against a stop section of the hub-side transmission part. In this case, it is particularly preferable if the stop section of the hub-side transmission part is comprised by the compressor component. Such a mechanical locking of the hub-side transmission part functions reliably and has a low susceptibility to malfunction, which increases the operational reliability of the compressor assembly according to the invention. The locking section of the hub-side coupling element can be brought into contact or out of contact with the stop section of the hub-side transmission part, for example by means of a translatory movement or by means of a pivoting movement.

It is advantageous if the hub-side coupling element is embodied in such a way that when it switches into the locked position, it pushes the hub-side transmission part into a position in which, regardless of the position of the wheel mount-side transmission part, it has no direct contact with the wheel mount-side transmission part. This prevents unnecessary wear on the hub-side transmission part. In addition, a compressor assembly of this kind is silent in the freewheeling mode, i.e. in the disengaged state, since there is no contact between the hub-side transmission part and the wheel mount-side transmission part.

It is also in keeping with the spirit of the invention if the locking section of the hub-side coupling element transitions gradually into a release section of the hub-side coupling element, the release section being positioned offset relative to the locking section, viewed in the direction of the translatory movement of the compressor component. This enables a sliding transition of the coupling element from the release position into the locked position. In particular, the combination of this embodiment with the spring prestressing of the coupling element offers particular advantages. If the coupling element is not brought into the release position or held in this position by being acted on with pressure by means of the pressure fluid, then it automatically and smoothly slides into the locked position. Such a gradual transition between the positions results in a silent operation or switching of the compressor assembly. This also makes it possible to minimize the wear on the apparatus according to the invention.

It is also advantageous if the coupling device can be actuated by means of pressure fluid from the tire cavity supplied via a pressure line; in particular, the coupling element can be switched from the locked position into the release position by means of pressure fluid from the tire cavity. The actuation of the coupling device by means of pressure fluid from the tire cavity constitutes an advantageous option for actuating the coupling device since the actuation does not require an external energy supply.

It is particularly advantageous if, situated fluidically between the coupling device and the tire cavity, a coupling valve is provided, which is contacted by the pressure fluid from the tire cavity and opens when the tire pressure falls below a threshold, as a result of which the coupling device is actuated by means of pressure fluid from the tire cavity and the hub-side transmission part is brought into cooperation with the wheel mount-side transmission part. This makes it possible, without an external energy supply, to supply the tire cavity with pressure fluid and to ensure sufficient pressure since as soon as the pressure in the tire cavity falls below a tire pressure threshold, the tire is automatically supplied with more pressure fluid. This obviates the need for a separate control mechanism. The compressor assembly can operate in an efficient, low-maintenance, reliable fashion with an inexpensive design.

It is also advantageous if the coupling valve is embodied in such a way that when a tire pressure set point that preferably lies above a tire pressure threshold is exceeded, the valve closes, thus interrupting the action of the pressure fluid on the coupling device, preferably with the coupling valve or a relief valve being embodied in such a way that when the tire pressure set point is exceeded, the coupling device is evacuated. As a result of this, the operation of the compressor assembly is more or less automatically and immediately stopped when the tire pressure set point is reached. The combination of this embodiment with an embodiment in which the hub-side transmission part is prestressed into a position in which it cooperates with the wheel mount-side transmission part offers particular advantages since the compressor assembly reacts with a particularly fast response time when certain pressure values in the tire cavity are reached. In other words, in the above-described embodiment, it is always assured that when the coupling element moves into the release position or generally when the hub-side transmission part is released, it switches into a position in which it cooperates into the wheel mount-side transmission part. In a certain sense, this also provides a certain emergency operability through the use of the compressor assembly according to the invention.

It is also advantageous if the compressor assembly comprises multiple compressor components, which are preferably positioned distributed uniformly in a circumference direction around the axis of rotation. In this case, it is particularly advantageous if the wheel mount-side transmission part is embodied in such a way that compressor components that are respectively positioned symmetrically opposite each other relative to the axis of rotation [missing verb] moved in opposite directions. Are moved by the cooperation of the hub-side transmission part with the wheel mount-side transmission part. Figuratively speaking, the one overhead compressor component is moved upward when an underlying compressor component is moved downward and vice versa. In this embodiment, compressor components that are situated opposite each other relative to the axis of rotation are thus each moved in opposite directions by means of the cooperation of the hub-side transmission part with the wheel mount-side transmission part. The asymmetrical arrangement of compressor components around the axis of rotation is also in keeping with this; the cooperation of the hub-side and wheel mount-side transmission parts is embodied in a way that enables a smooth operation of the compressor assembly.

It is also advantageous if a flutter valve is positioned on the compressor component. This constitutes a particularly inexpensive, simple structural measure for filling the compression chamber with pressure fluid. In particular, ambient air serves as the pressure fluid here, which is aspirated by means of the flutter valve and when the compressor component is reduces the volume of the compression chamber, i.e. when the compressor component is in the delivery stroke, the flutter valve closes. But the invention is not limited to the use of flutter valves; it is naturally also possible to use other check valves or other devices in an advantageous way.

It is also advantageous if the compressor component is equipped with a double seal, which defines a lubricant reservoir of the compressor component and at the same time, seals the compression chamber relative to the compressor component. Such a double seal has advantageous sealing properties, which minimizes the leakage at the compressor component. Furthermore, the lubricant reservoir in the double seal results in a low-maintenance, smoothly running operation of the compressor assembly.

It is particularly preferable if the double seal comprises two annular seals and the lubricant reservoir is positioned between the annular seals. In this case, it is advantageous if the double seal is embodied of one piece, i.e. in the example of the annular seals, the annular seals are connected to each other. It is also preferable if the flutter valve is embodied of one piece with at least a part of a seal of the compressor component. This makes the compressor assembly particularly easy to assemble from a production standpoint. The flutter valve and the seal can be mounted on the compressor component in an advantageously simple way and in this case, it is particularly preferable if the seal is embodied in the form of the above-described double seal with a lubricant reservoir.

It is preferable if a hub-side part of the compressor assembly is embodied as largely annular. This constitutes a particularly space-saving design of the compressor assembly.

It is preferable if the hub-side transmission part comprises a roller tappet. This enables a particularly low-friction contact between the hub-side transmission part and the wheel mount-side transmission part.

It is preferable if the roller tappet is self-lubricating, preferably with a lubricant reservoir in a shaft of the roller tappet. There is thus always enough lubricant available to lubricate the roller.

It is also advantageous if lubricant in the lubricant reservoir is prestressed in the direction of a roller of the roller tappet by means of a prestressing device. This ensures a continuous lubrication of the roller even in the most adverse circumstances.

It is preferable if the lubricant reservoir comprises a leak prevention element at the roller end. The compressor assembly is thus particularly operationally reliable.

It is also advantageous if it comprises a device, which is for measuring and/or displaying the pressure, the temperature, and/or the humidity of the pressure fluid in the tire cavity and which preferably can be connected to the tire cavity via the pressure fluid line. It is thus possible to continuously and reliably detect the parameters of the pressure fluid in the tire since the compressor assembly can always remain in contact with the pressure fluid in the tire cavity.

It is advantageous if the compressor assembly is connected to a filter on the pressure fluid inlet side. This prevents clogging of the compressor assembly.

It is advantageous if the compressor assembly is embodied to use pressure fluid, which is from the tire cavity or supplied by means of the compressor assembly, for the cleaning of the filter. This provides the compressor assembly with a self-maintenance function.

BRIEF DESCRIPTION OF THE DRAWINGS

Other features, possible applications, and advantages of the invention ensue from the following description of exemplary embodiments of the invention, which will be explained based on the drawings; the features can be essential to the invention both by themselves and in different combinations without further reference being explicitly made thereto.

FIG. 12 shows a compressor assembly according to one embodiment of the invention.

DETAILED DESCRIPTION OF THE INVENTION

Figure 1:
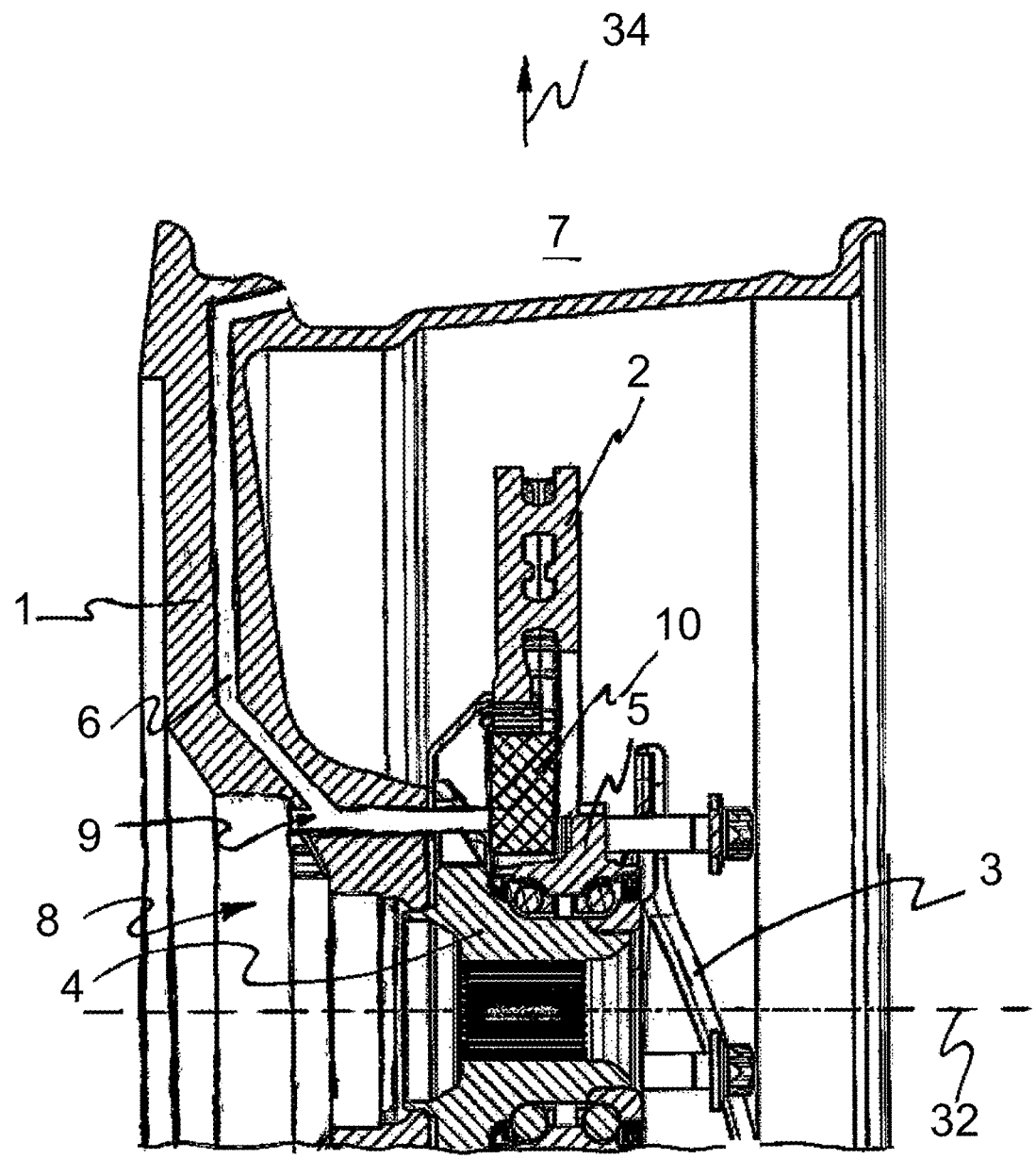
FIG. 1 shows a schematic depiction of the arrangement of a compressor assembly according to one embodiment of the invention.

In the figures described below, corresponding components and elements are provided with the same reference numerals. For the sake of clarity, not all of the reference numerals are shown in all of the figures.

FIG. 1 schematically depicts the installation position of a compressor assembly 10 according to the invention. In FIG. 1, the compressor assembly 10 is indicated only schematically in the form of a cross-hatched surface.

A rim is labeled with the reference numeral 1. A brake rotor is labeled with the reference numeral 2, a wheel mount with the reference numeral 3, a wheel hub with the reference numeral 4, and a wheel bearing with the reference numeral 5.

A pressure fluid line 6 extends from the compressor assembly 10 to a tire cavity 7. The tire itself is not shown in FIG. 1.

In the region of a wheel hub seat 8, the rim has a schematically depicted connection 9 for supplying a sealant. The connection 9 here is optional.

In the embodiment shown in FIG. 1, the pressure fluid line 6 extends through the material of the rim 1. A section of the pressure fluid line 6 is advantageously embodied by means of a hollow-bored brake rotor-fastening bolt of the brake rotor 2. An axis of rotation is labeled with the reference numeral 32. A radial direction is labeled with the reference numeral 34. During operation of the vehicle, the hub side and thus the hub-side components rotate(s) around the axis of rotation 32 relative to the wheel mount side, i.e. the wheel mount-side components such as the wheel mount or also the passenger compartment of the vehicle.

Figure 2:
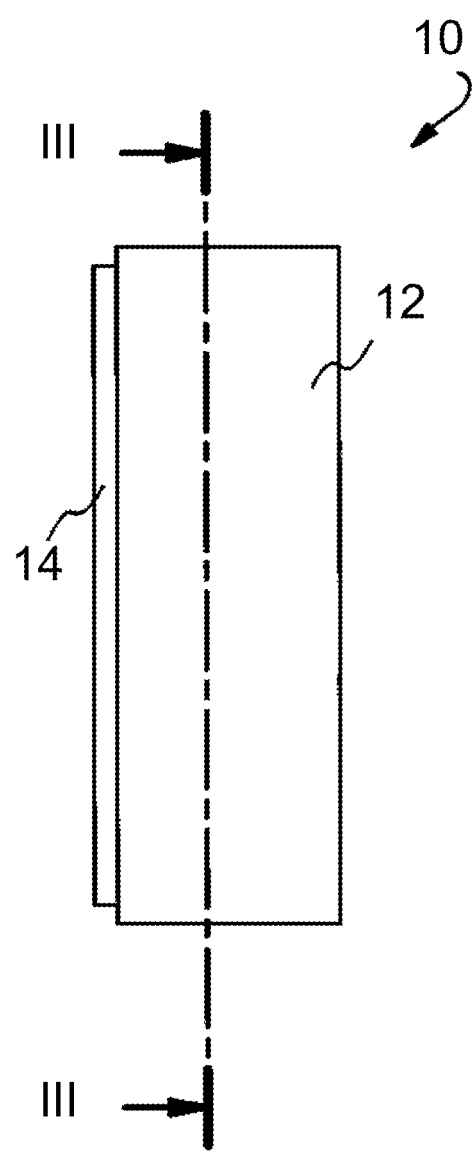
FIG. 2 shows a compressor assembly according to one embodiment of the invention.

FIG. 2 shows a detailed depiction of a first embodiment of a compressor assembly 10 according to the invention. The compressor assembly 10 comprises a first housing part 12 and a second housing part 14.

Figure 3:
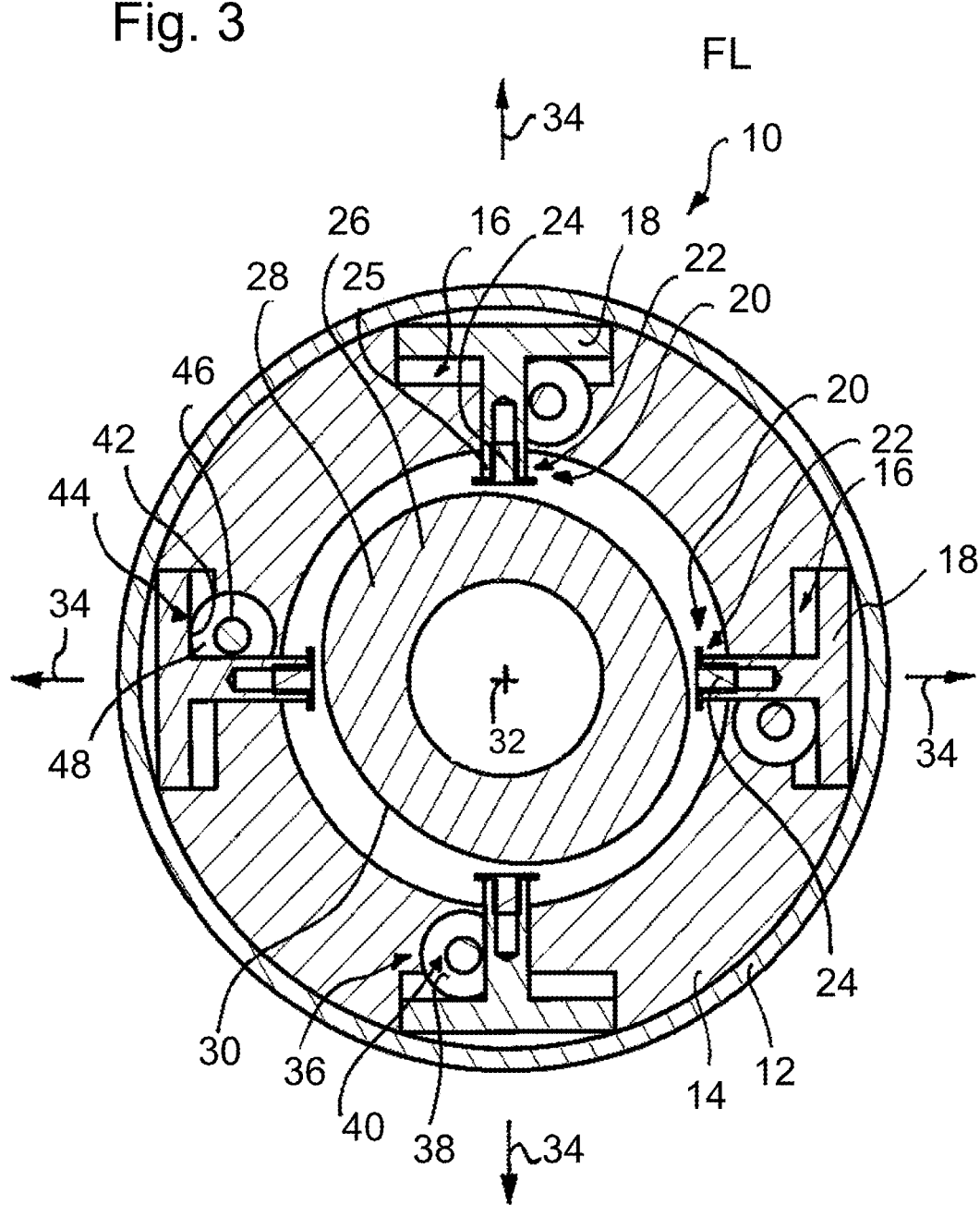
FIGS. 3-11 are each a sectional view of the compressor assembly of FIG. 2.
Figure 4:
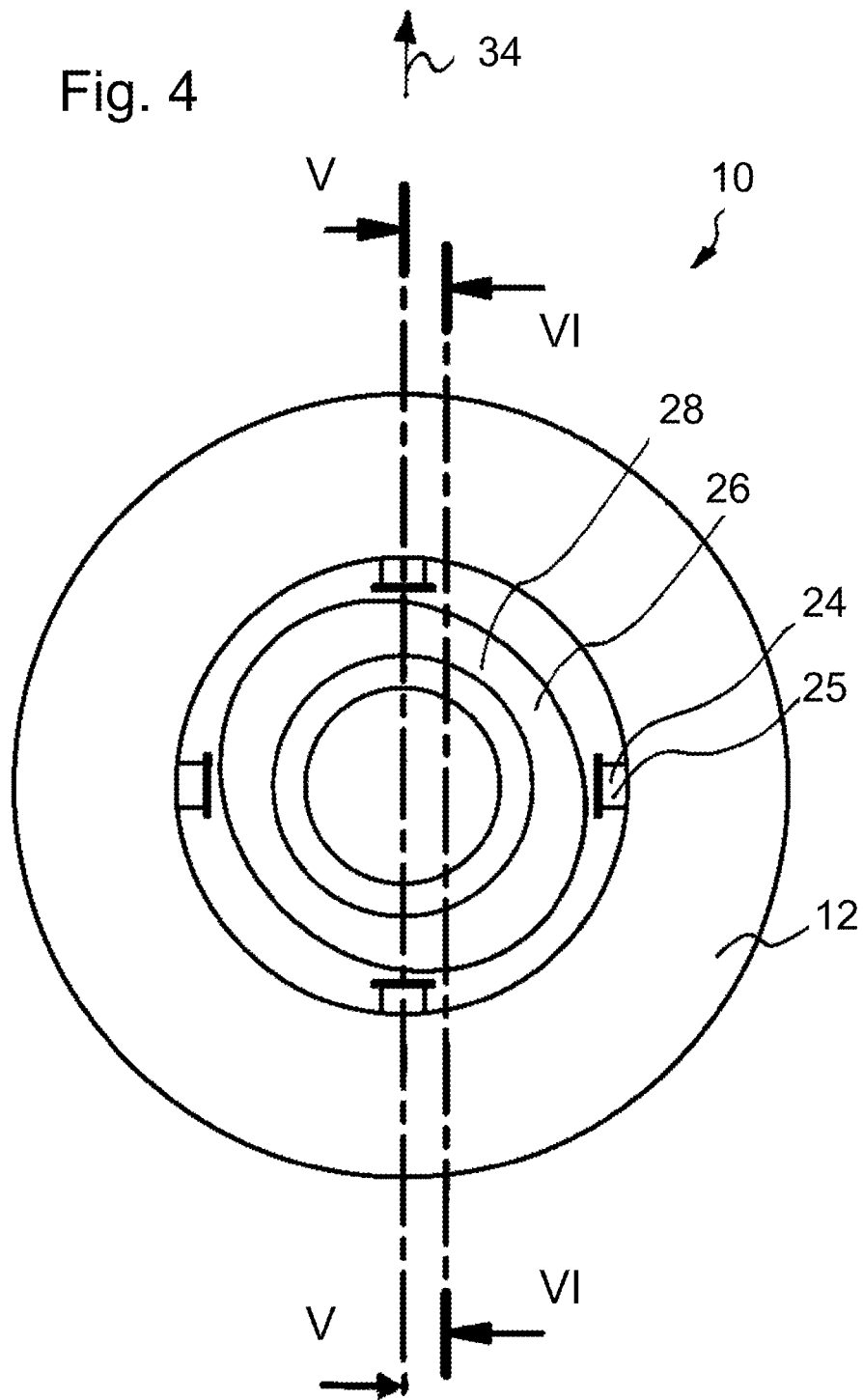
Figure 5:
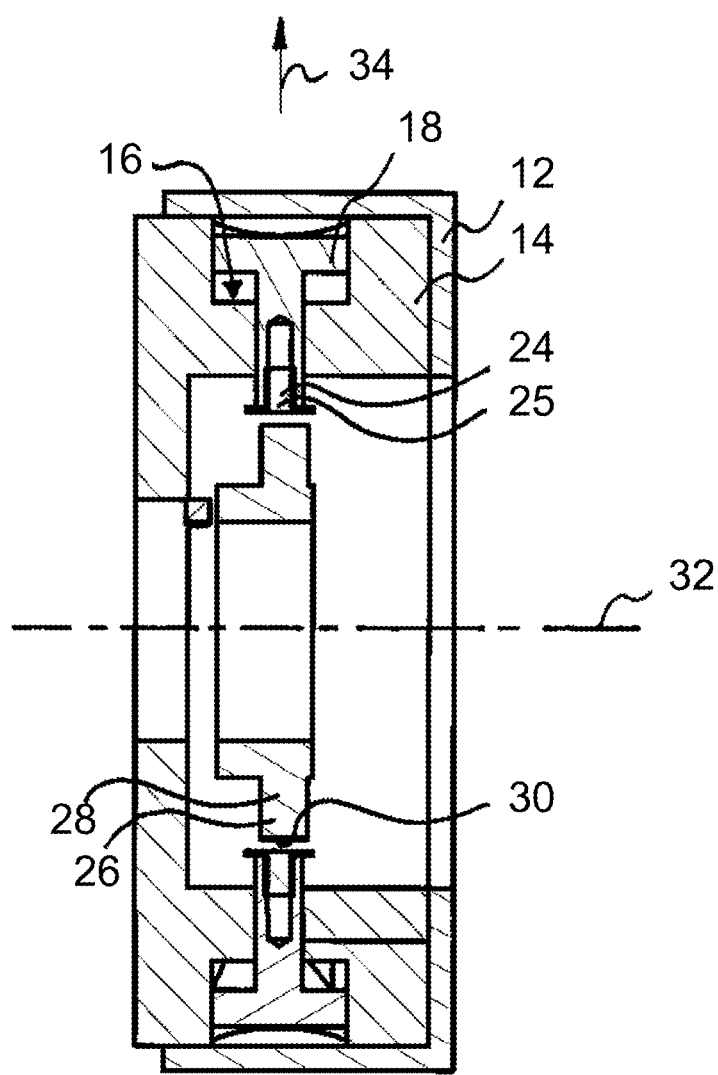

FIG. 3 shows the compressor assembly 10 from FIG. 2 in a sectional view cutting along the line III-III. The compressor assembly 10 here comprises a total of four hub-side compression chambers 16, only two of which are labeled with a reference numeral.

Each of the compression chambers 16 is associated with a hub-side compressor component 18, only two of which are labeled with a reference numeral. The compressor assembly 10 comprises a plurality of transmission mechanisms 20, each of the compression chambers 16 being associated with a transmission mechanism 20. In the present case, the transmission mechanisms 20 are each embodied as a cam mechanism 22.

The transmission mechanisms 20 each have a hub-side transmission part 24. The hub-side transmission parts 24 are embodied in the form of respective plunger output elements 25. The compressor components 18 in this case are embodied as one piece with the plunger output elements 25 or hub-side transmission parts 24. The hub-side transmission parts 24 of the transmission mechanisms 20 can each cooperate with a respective wheel mount-side transmission part 26 of the compressor assembly 10.

As is clear from FIG. 3, the compressor assembly 10 has only a single wheel mount-side transmission part 26, which can cooperate with each of the hub-side transmission parts 24. The wheel mount-side transmission part 26 is embodied as a disk cam 28 with an external cam contour 30.

FIG. 3 shows the compressor assembly 10 in a freewheeling mode position FL. In the freewheeling mode position FL, the hub-side transmission parts 24 do not cooperate with the wheel mount-side transmission part 26.

In the freewheeling mode position FL, the hub-side transmission parts 24 are advantageously in a position, as shown in FIG. 3, in which regardless of the orientation of the wheel mount-side transmission part 26, they cannot come into contact with the latter. This is achieved by means of coupling devices 36 with which each of the hub-side transmission parts 24 is associated. The coupling devices 236 each comprise a coupling element 38. In the freewheeling mode position shown in FIG. 2, the coupling elements 38 are each situated in a locked position 40. In this locked position 40 of the coupling element 38, the hub-side transmission parts 24 are each prevented from cooperating with—and in the present case, also coming into contact with—the wheel mount-side transmission part 26.

In the locked position 40, a locking section 42 of the respective coupling elements 38 rests against a respective stopping section 44 of the respective hub-side transmission parts 24. In this case, the stopping section 44 is embodied on the compressor component 18 that is embodied of one piece with the hub-side transmission part 24.

The coupling elements 38 here are embodied as pin-like and in addition to the locking section 42, also each comprise a respective releasing section 46 and a transition section 48.

The locking section 42 here is embodied as cylindrical with a first diameter and the releasing section 46 is embodied as cylindrical with a second diameter. The transition section 48 from the locking section 42 to the releasing section 46 is embodied in the form of a truncated cone.

The releasing section 46 is positioned offset from the locking section 42 in the radial direction 34. If one of the coupling elements 38 moves from the release position into the locked position 40, then it pushes the associated hub-side transmission part 24 into the position in which it cannot come into contact with the wheel mount-side transmission part 26.

The coupling elements 38 are each prestressed into the locked position by respective springs 49. The coupling elements 38 can each be switched into the release position by being acted on with pressure fluid supplied via a pressure fluid conduit 56.

Once the pressure fluid impingement via the pressure fluid conduit 56 is interrupted, the coupling elements 38 move back into the locked position since they are prestressed with springs.

The hub-side transmission parts 24 and the compressor components 18 in this case are pushed radially outward, specifically into a position in which they lift away from the radially inner wheel mount-side transmission part 26. The compressor assembly 10 is then in the freewheeling position FL. The conically extending transition section 48 enables this pushing of the hub-side transmission part 24 in a radially outward direction and the transition from the release position to the locked position occurs smoothly and gradually.

Since the hub-side transmission parts 24 are likewise prestressed, by springs in this case, the springs 49 for prestressing the coupling elements 38 must be embodied as stronger than the springs for prestressing the hub-side transmission parts. This prestressing in cooperation with the conical transition section 48 makes it possible to push the hub-side transmission parts 24 into the raised position.

Figure 6:
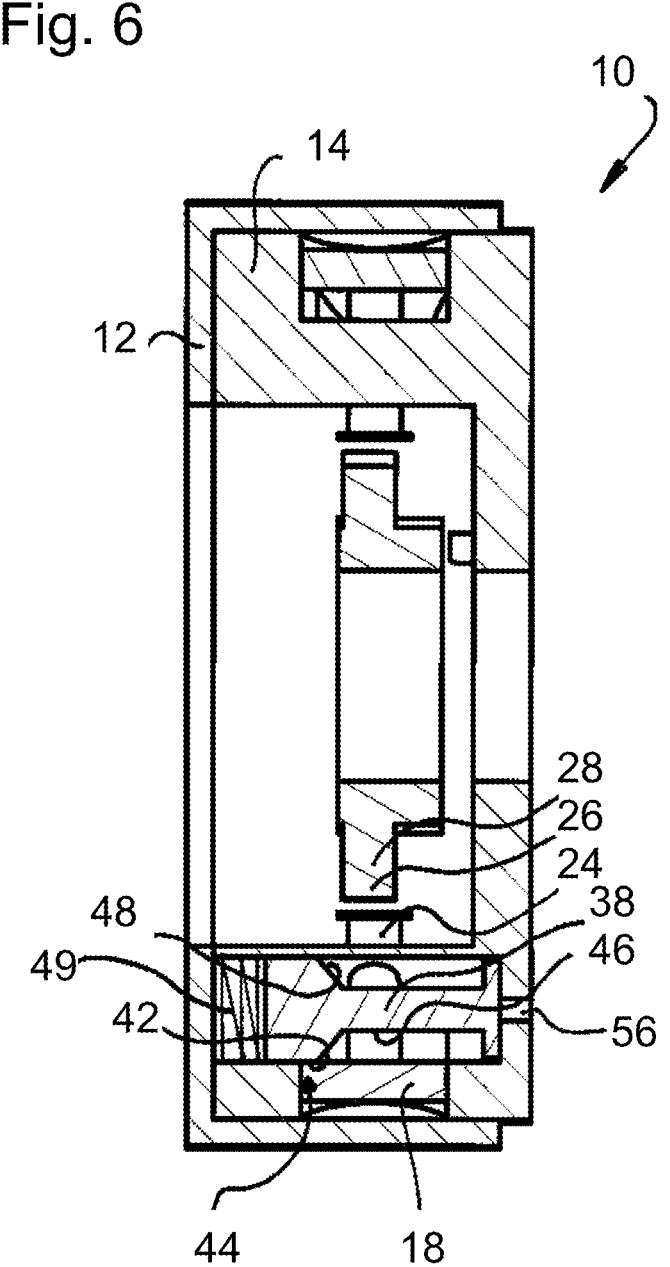
Figure 7:
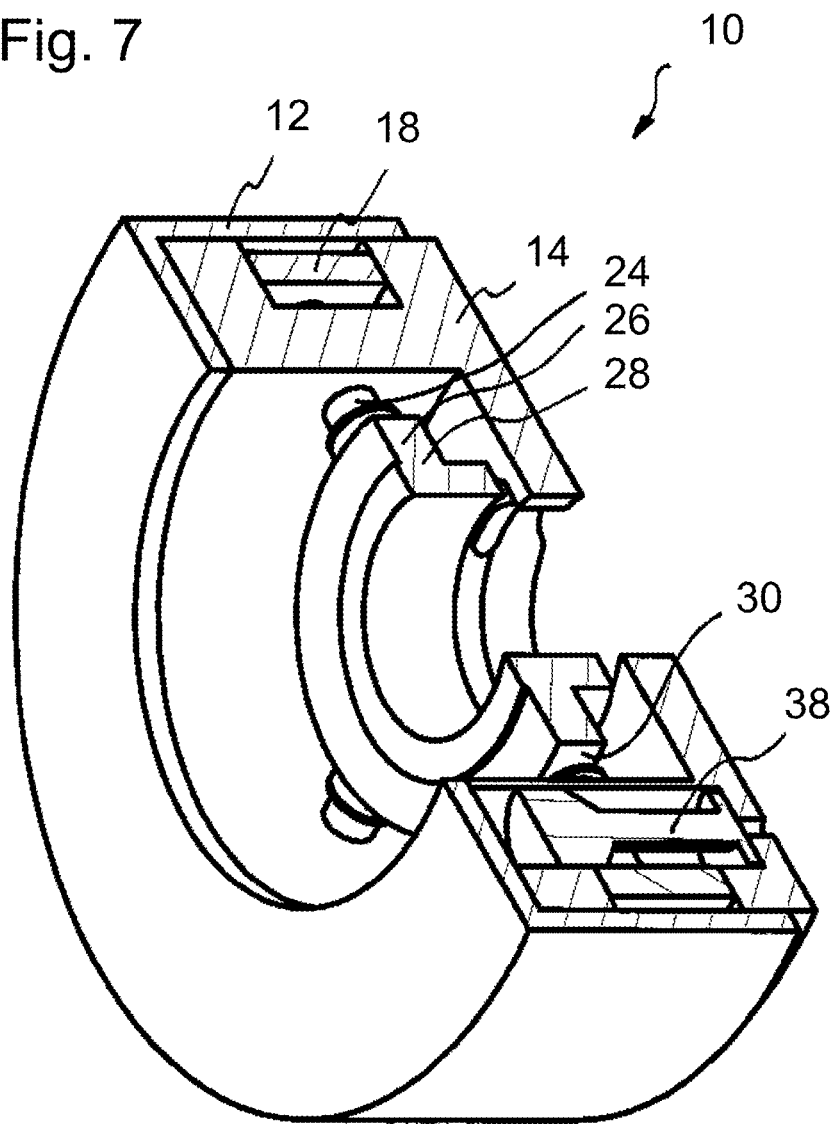

In FIG. 6, the locked position of the coupling elements 38 is shown in a particularly clear way for one of the coupling elements 38.

FIGS. 8 to 11 show various views and sectional depictions of the compressor assembly 10 from FIGS. 2 to 6 in a working mode position AB.

Figure 8:
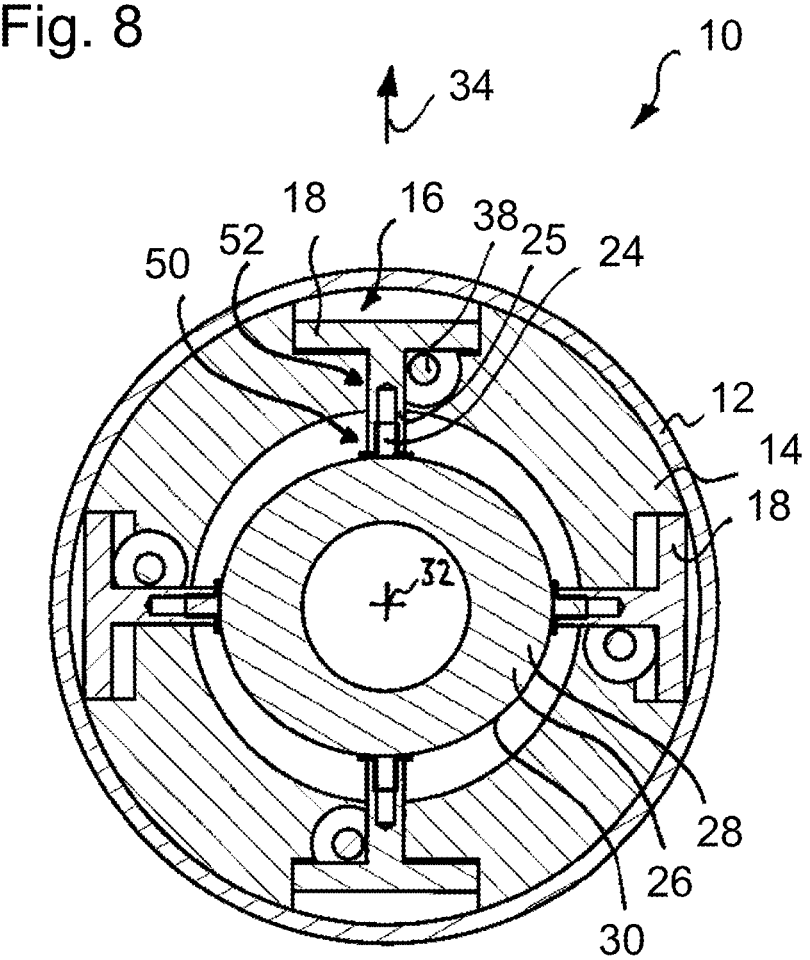
Figure 9:
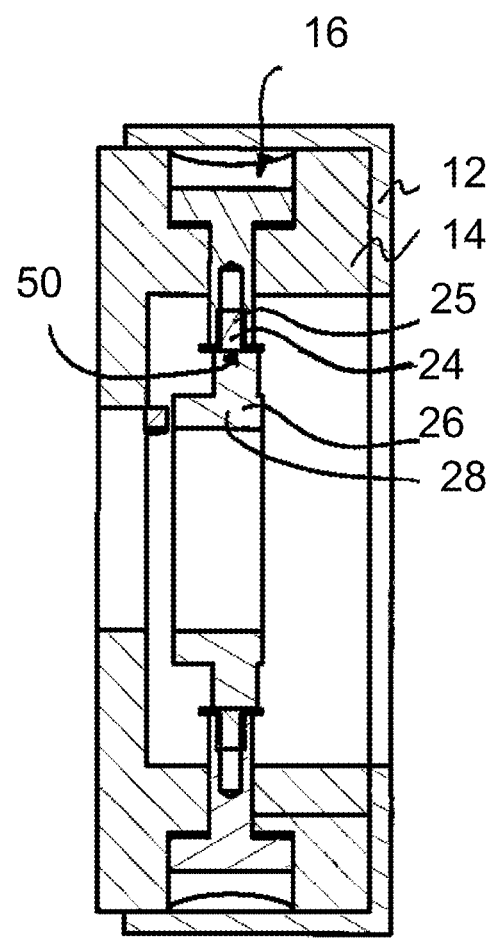

In FIG. 8, it is clear that in the working mode position AB, the hub-side transmission elements 24 come into contact with the wheel mount-side transmission element 26. A respective contact point of the hub-side transmission parts 24 with the wheel mount-side transmission element 26 is labeled with the reference numeral 50.

As is apparent in FIG. 8, the hub-side transmission parts 24 are each supported in a linear guide 52 in such a way that they permit a translatory movement of the compressor component 18.

In the embodiment shown in FIGS. 2 to 11, the contact point 50 is respectively situated between the linear guide 52 and the axis of rotation 32, viewed in the radial direction 34.

The hub-side transmission parts 24, which each constitute a plunger output element 25, can be driven by means of the outer contour 30 of the cam disk 28 or of the wheel mount-side transmission part 26.

During operation of the compressor assembly 10, as shown in the working mode position AB in FIGS. 8 to 11, the hub-side components move in rotary fashion relative to the wheel mount-side components. In relation to the vehicle, the wheel mount-side components are stationary whereas the hub-side components rotate relative to the vehicle.

In the depiction in FIG. 8, this corresponds to a fixed positioning of the wheel mount-side transmission part 26 whereas the housing parts 12 and 14 rotate around the axis of rotation 32 together with the hub-side transmission parts 24.

The contact points 50 of the hub-side transmission parts 24 in this case slide along the outer contour 30 of the disk cam 28. Since the outer contour 30 of the disk cam 28 has a curve extending around the axis of rotation 32 that deviates from the curve of a circular path extending concentrically around the axis of rotation 32, the above-described rotary movement is converted into a linear movement of the hub-side transmission parts 24 and of the compressor components 18 that are embodied of one piece with them.

In other words, the compressor components 18 execute an oscillating translatory movement in the radial direction 34.

In the course of this, the volume of the compression chambers 16 is respectively reduced and increased. The compression chambers 16 of the compressor assembly 10 contain pressure fluid, in this case air, which is respectively fed to a tire cavity 7 when the volume of the compression chambers 16 decreases.

If the volume of the compression chambers 16 increases, this causes a closing of check valves, which interrupt the connection between the tire cavity 7 and the compression chamber 16. In reaction, this causes an opening of check valves, which enable an intake of ambient air serving as a pressure fluid into the compression chambers 16.

A comparison of FIGS. 6 and 12 offer a particularly clear depiction of how the coupling device 40 works.

Figure 10:
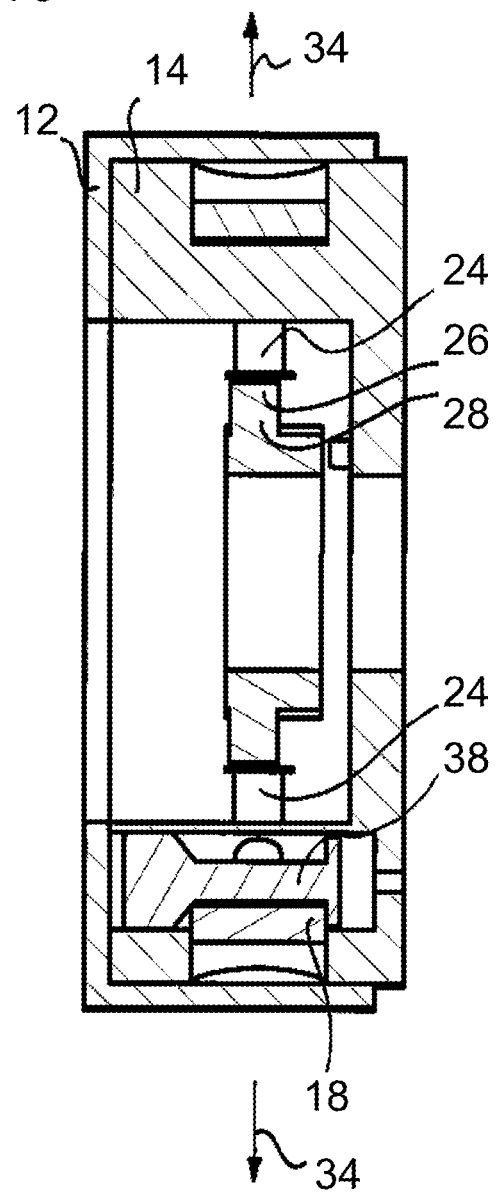
Figure 11:
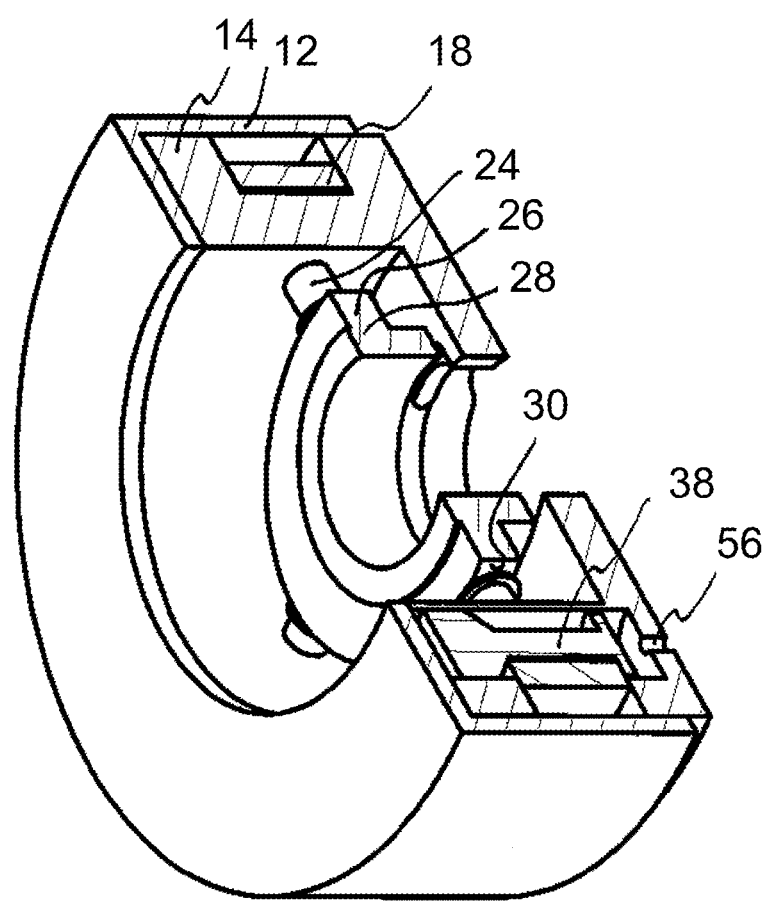

In FIG. 10, the sole coupling element 38 shown is in the release position. The compressor component 18 can move freely in the radial direction.

FIGS. 12 to 21 show an alternative embodiment of the compressor assembly 110. In the embodiment shown in FIGS. 12 to 21, viewed from the axis of rotation 32, the wheel mount-side transmission part 126 is situated radially outside of the hub-side part—in particular outside of the hub-side transmission parts 124—of the compressor assembly 110.

Figure 13:
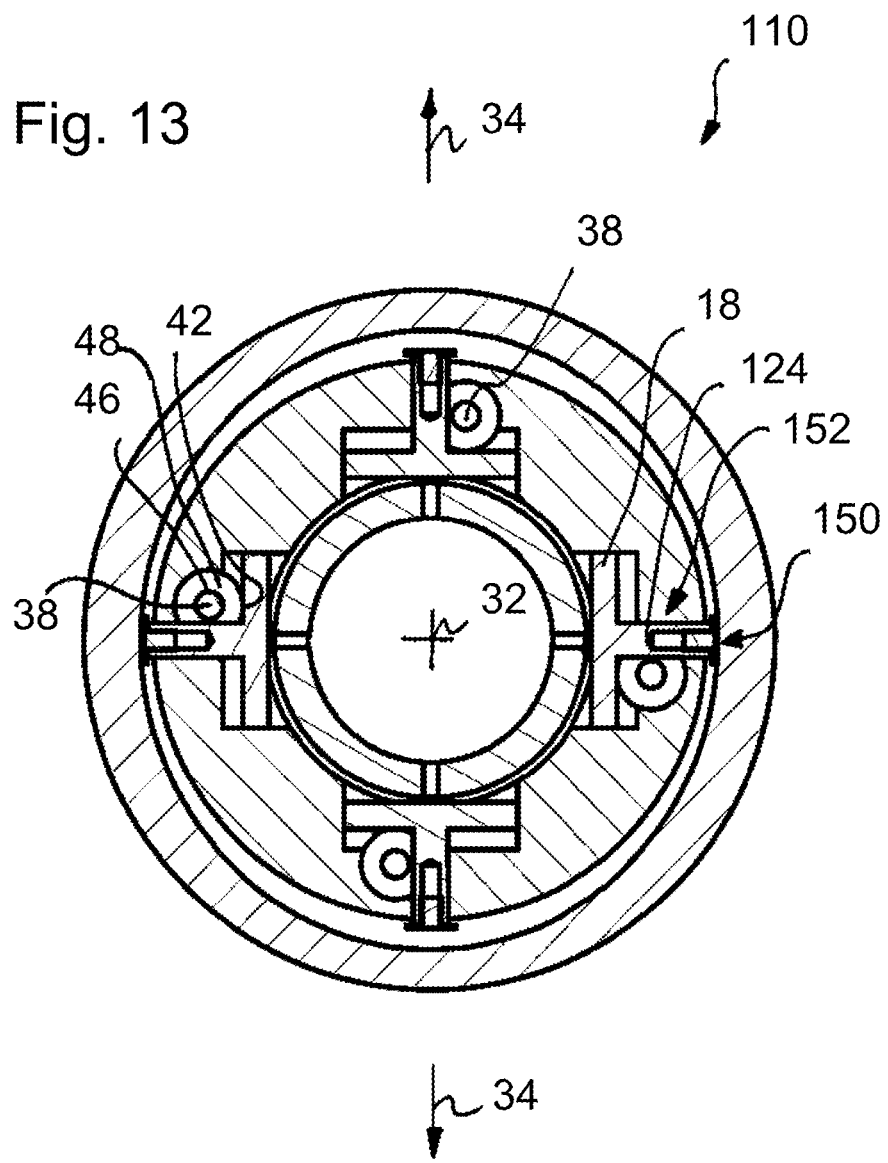
FIGS. 13-16 are each a sectional view of the compressor assembly of FIG. 12.
Figure 14:
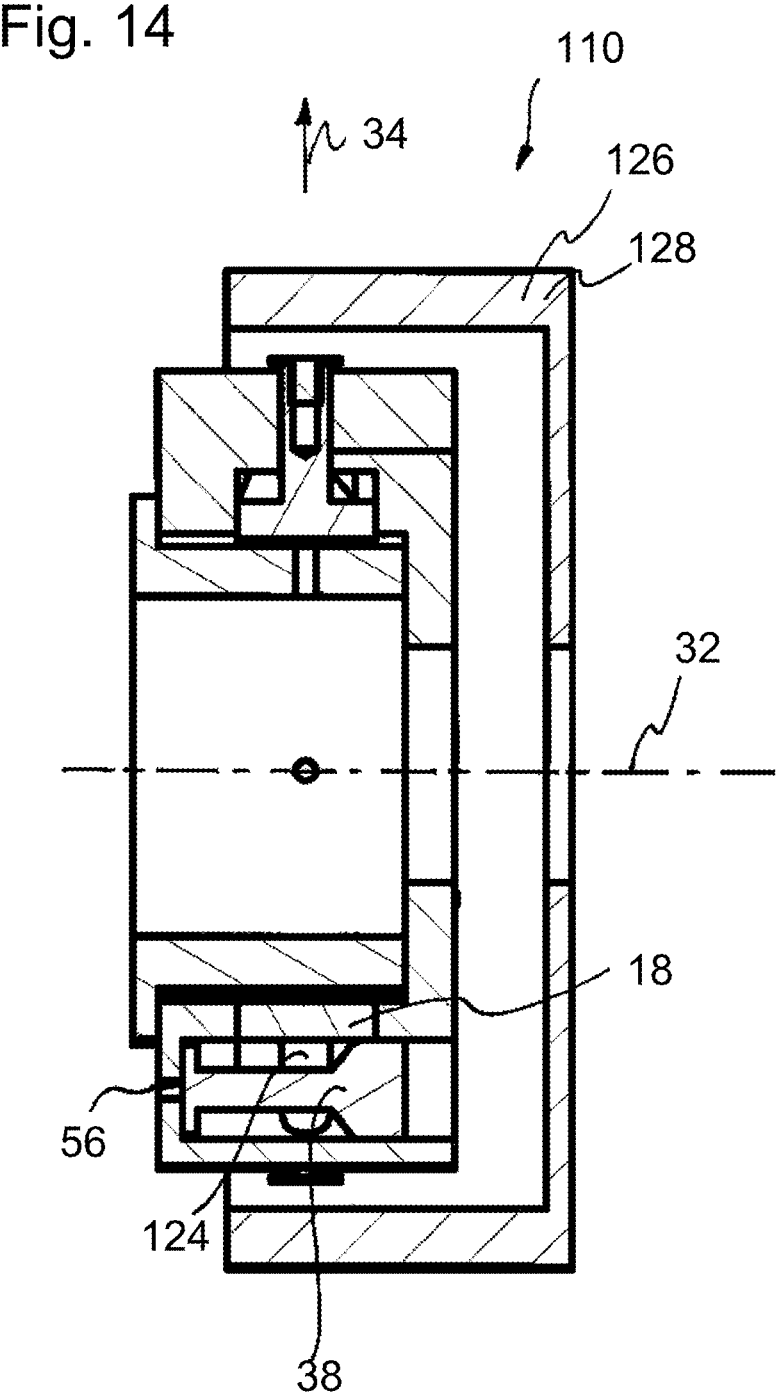
Figure 15:
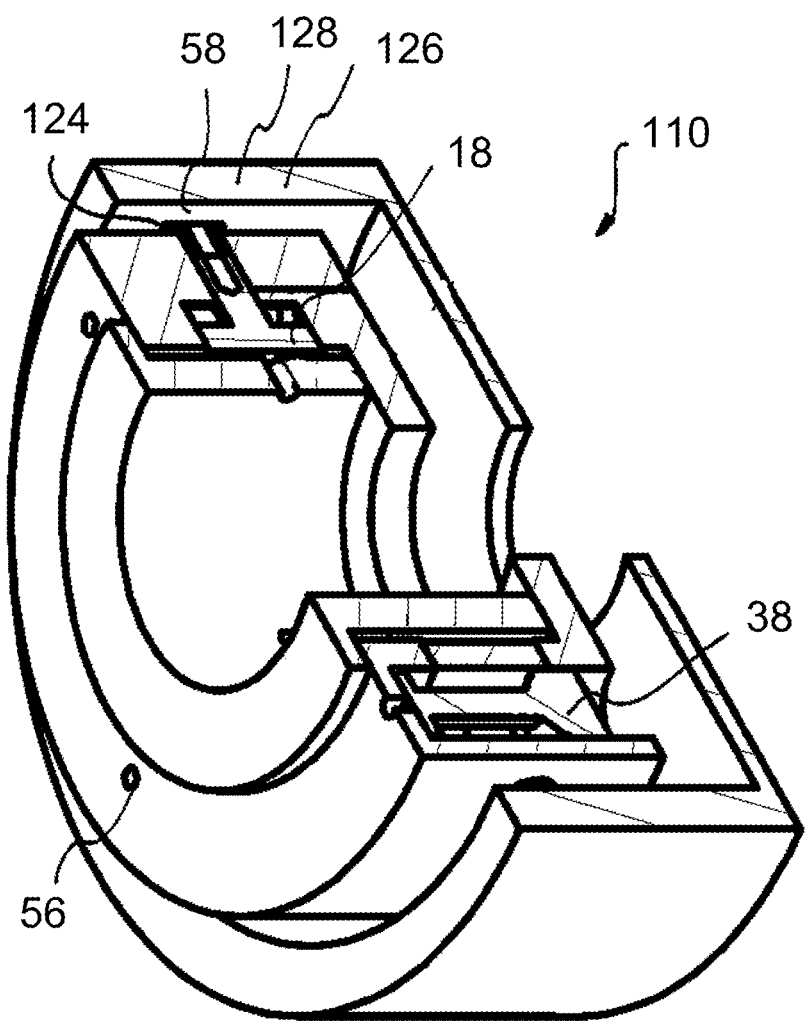
Figure 16:
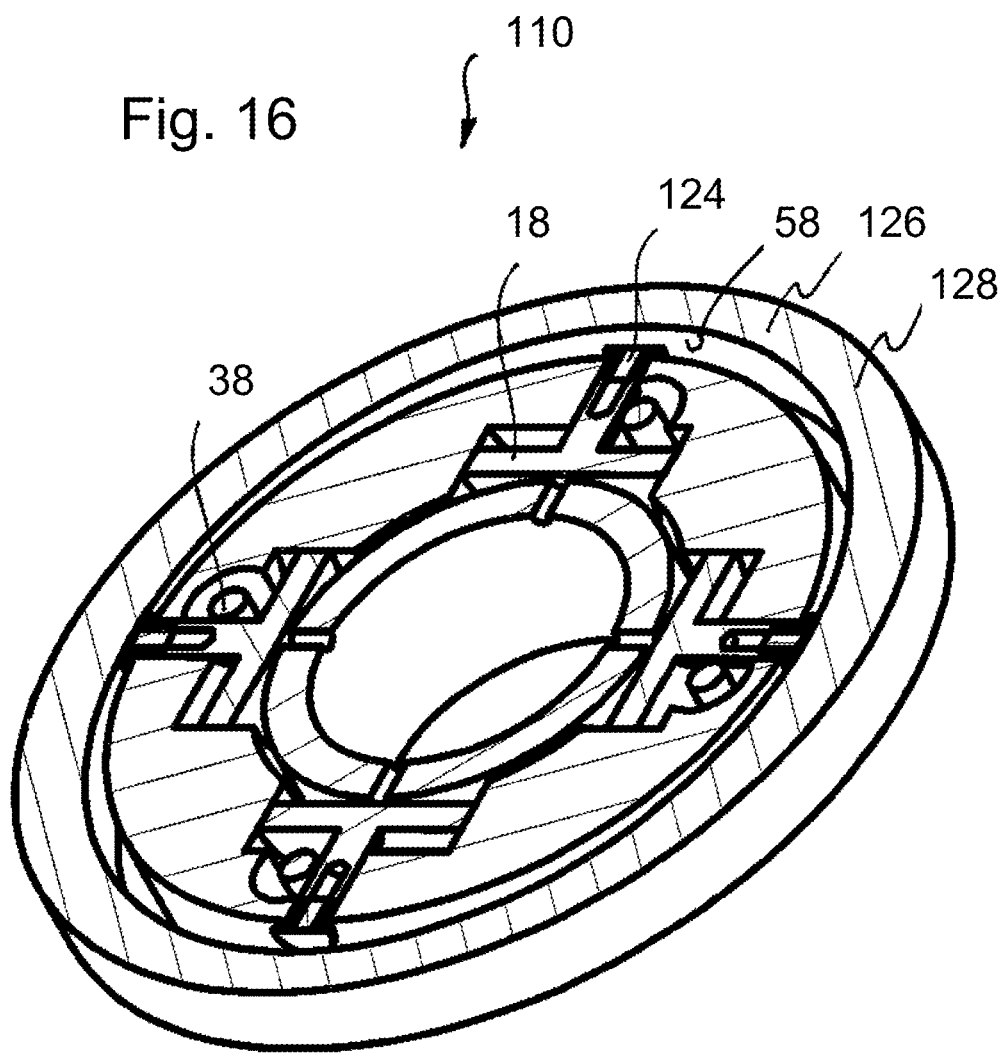
Figure 17:
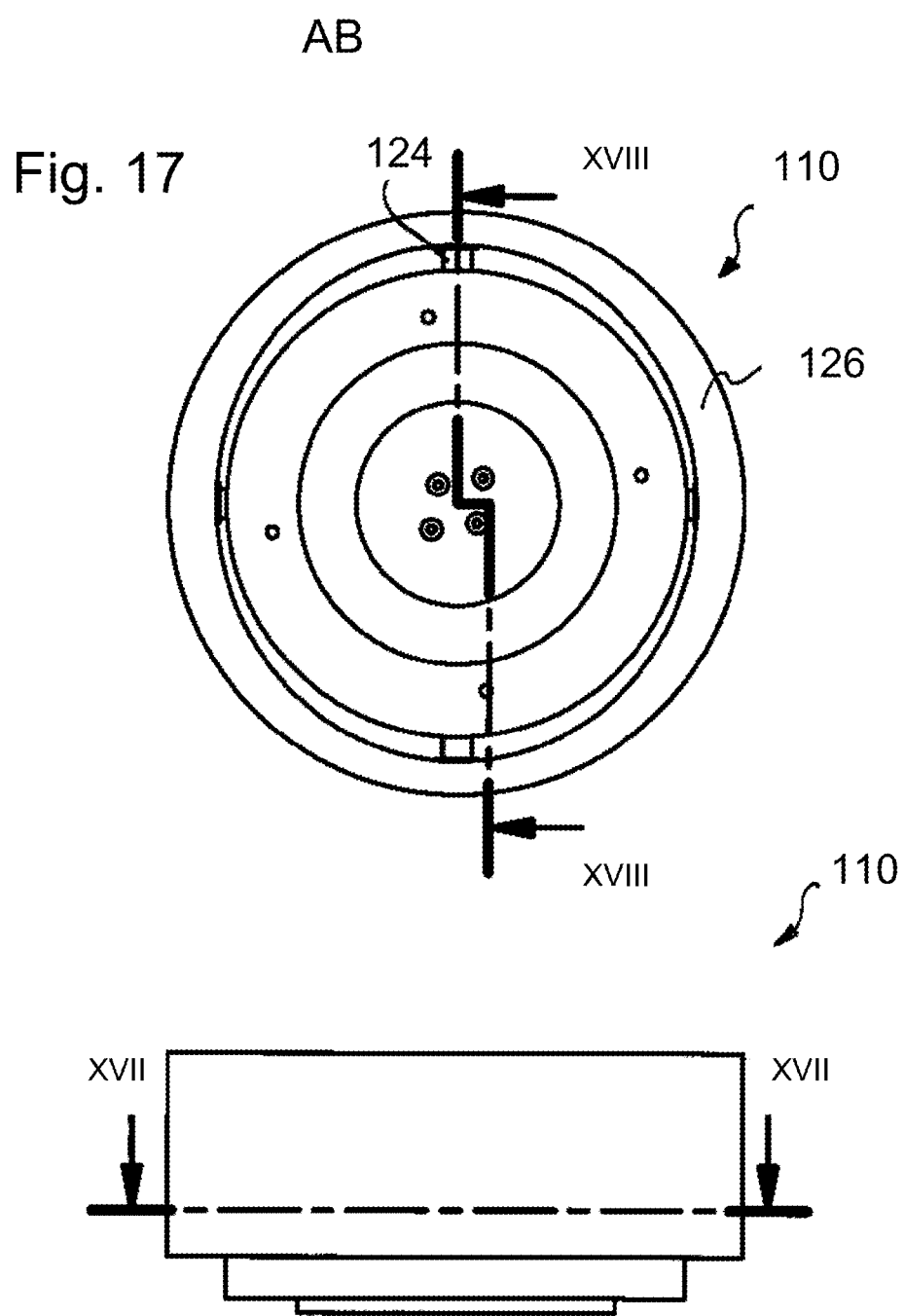
FIG. 17 shows a compressor assembly according to one embodiment of the invention.
Figure 18:
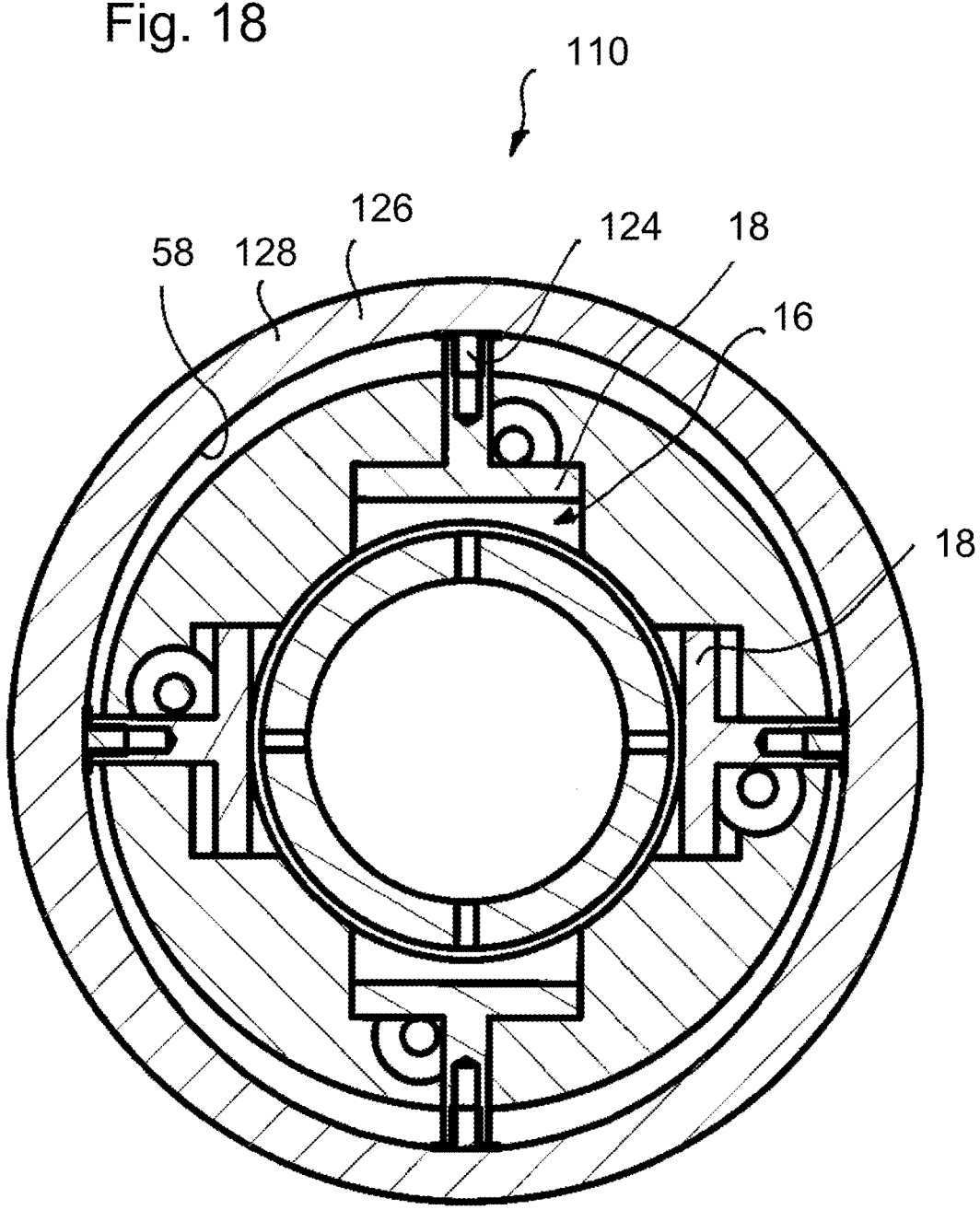
FIGS. 18-21 are each a sectional view of the compressor assembly of FIG. 17.
Figure 19:
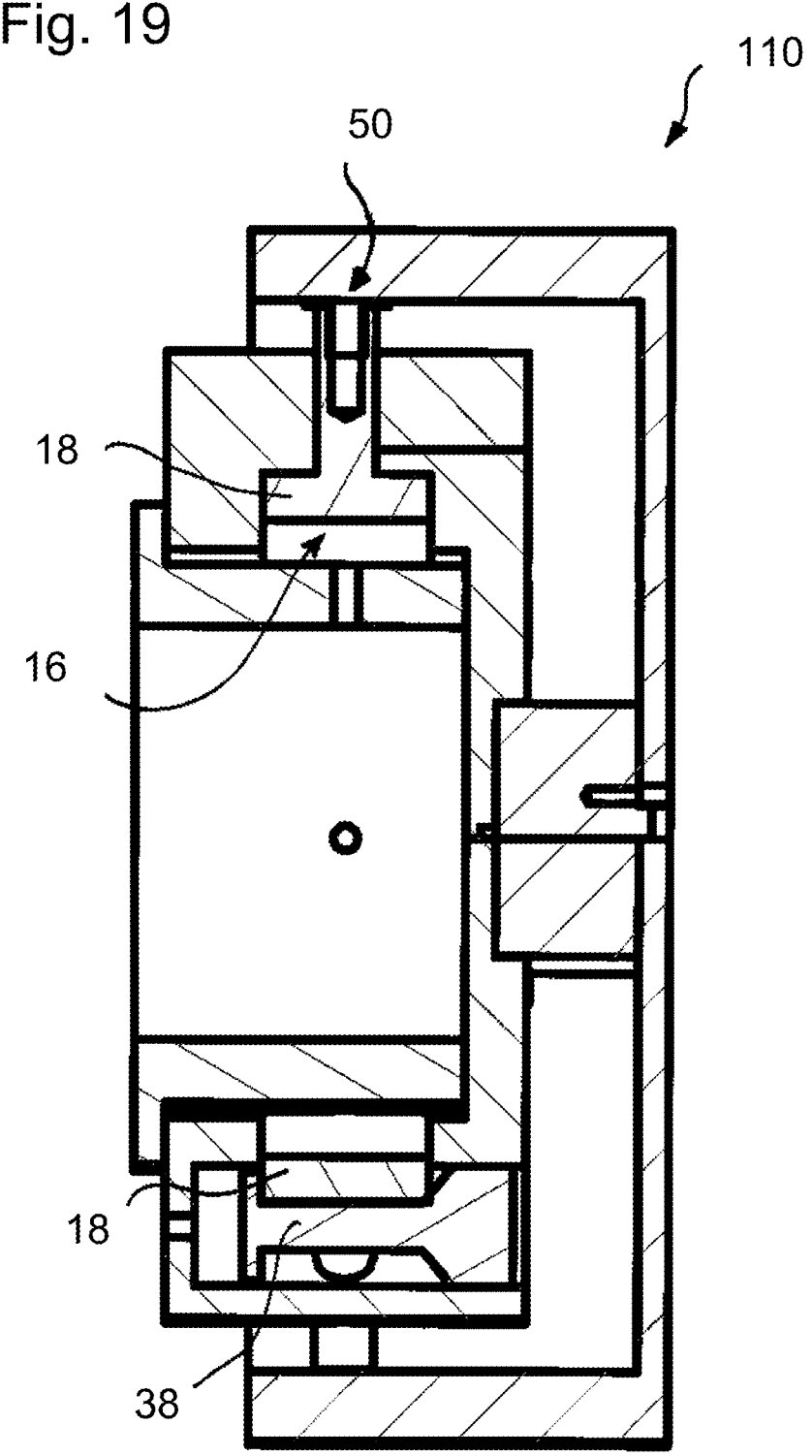
Figure 20:
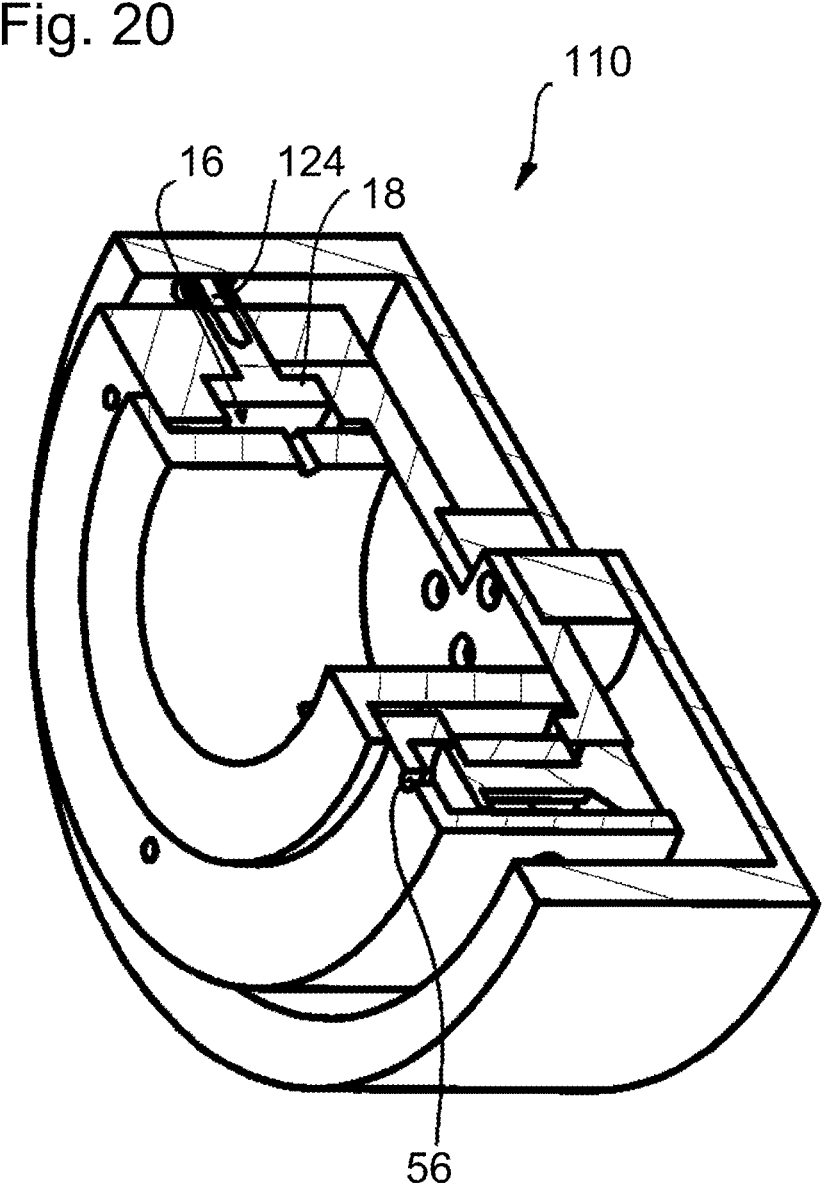
Figure 21:
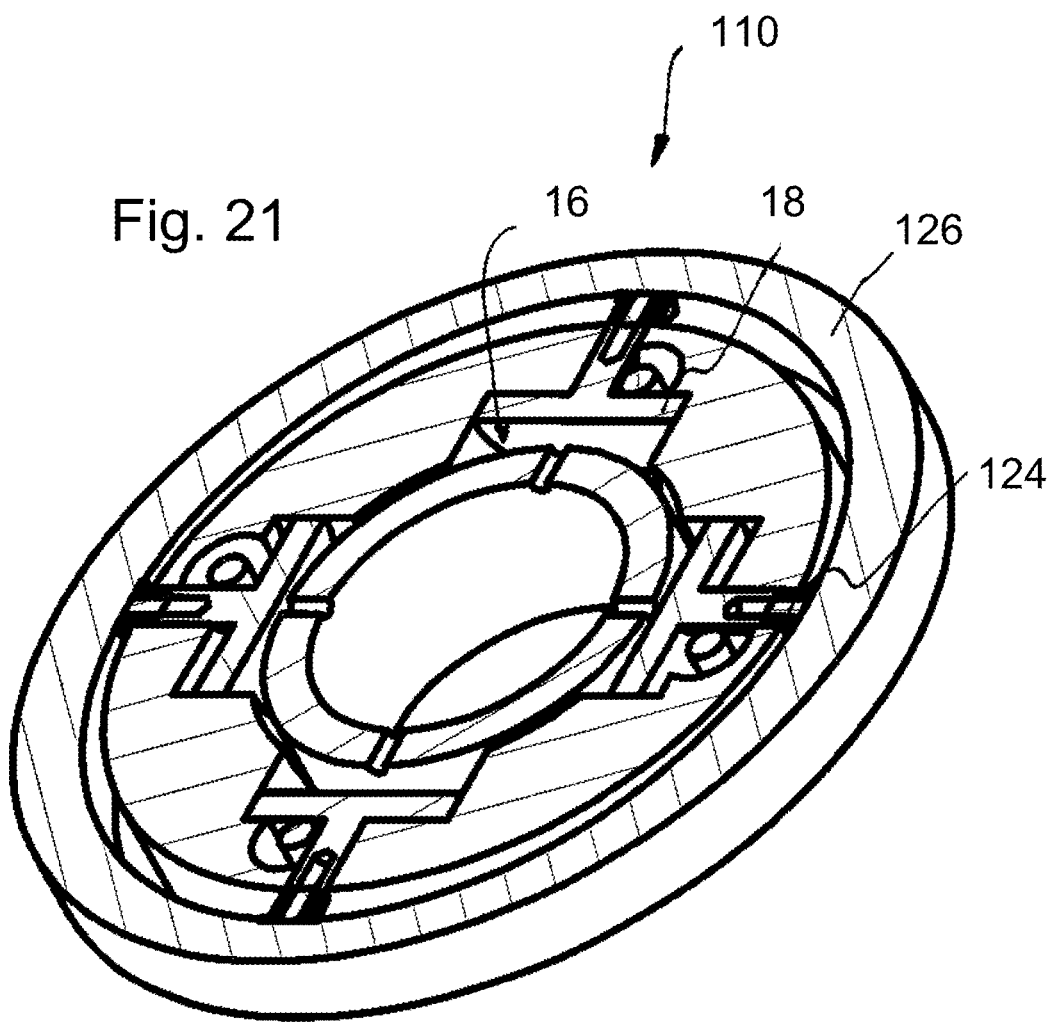

In the embodiment shown in FIGS. 12 to 21, the wheel mount-side transmission part 126 is likewise embodied as a cam disk 128. The contact points 50 of the hub-side transmission parts 24, however, are positioned in such a way that a respective linear guide 152 of the hub-side transmission parts 124 is situated in the radial direction between the respective contact point 150 and the axis of rotation 32; FIG. 13 shows this in a particularly clear way.

Instead of an external cam contour 30, the wheel mount-side transmission part 26 in the embodiment according to FIGS. 12 to 21 thus has an internal cam contour 58. The compressor assembly 110 from FIGS. 12 to 21 is shown in the working mode position AB in FIGS. 17 to 21.

As already explained in connection with FIGS. 8 to 11, in the working mode position, the hub-side transmission parts 124 cooperate with the wheel mount-side transmission part 126. Through the cooperation of the transmission parts 124 and 126, the compressor components 18 are set into an oscillating translatory movement by means of which pressure fluid can be fed from the compression chambers 16 to a tire cavity.

In FIGS. 12 to 16, the compressor assembly 110 of FIGS. 11 to 20 is shown in a freewheeling mode position FL. As already explained in connection with the compressor assembly in FIGS. 2 to 11, in the freewheeling mode position FL, the coupling elements 38 are each situated in a locked position in which they respectively engage behind the hub-side transmission parts 124 in a form-fitting manner in such a way that the hub-side transmission parts 124 are prevented from cooperating with the wheel mount-side transmission part 126.

Figure 22:
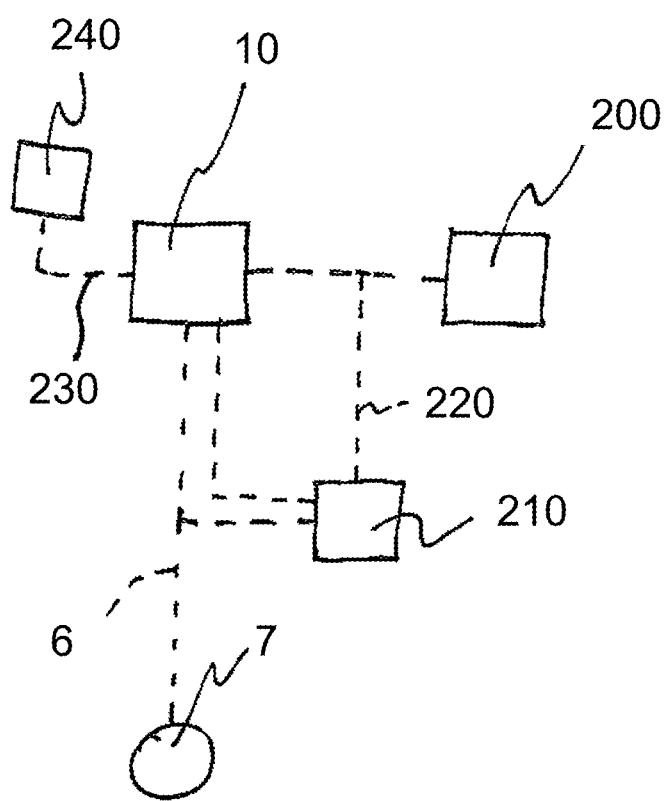
FIG. 22 is a schematic circuit diagram of a control unit of the compressor assembly, according to one embodiment of the invention.

As shown in FIG. 22, the compressor assembly 10 can generally be connected to a filter 200 and a control unit 210. The filter 200 in this case is preferably positioned in such a way that it is situated fluidically upstream of the pressure fluid inlets or air inlets of the compressor assembly 10.

By means of a measurement connection 220, the control unit 210 can detect when the filter 200 is clogged. If the control unit 210 detects a clogging of the filter 200, then the filter can be cleaned by acting on it with pressure fluid or air in the opposite flow direction. In the usual operating mode of the compressor assembly 10, air is conveyed through the filter 200 in the direction toward the compressor assembly 10 and is conveyed from there to the tire cavity 24. In a cleaning procedure, either pressure fluid or air is released from the tire cavity 24 and conveyed through the filter 200 in the opposite flow direction or the compressor assembly 10 commences operating and instead of feeding pressure fluid to the tire cavity 24, feeds it to the filter 200 in the opposite flow direction. To accomplish this, the compressor assembly 10 takes in pressure fluid via an additional inlet 230, which has another air filter 240 that can be cleaned in a similar way.

The control unit 210 can advantageously be used to measure and/or display the pressure, the temperature, and/or the humidity of the pressure fluid in the tire cavity 24, these functions being independent of the other functions of the control unit 210.

Figure 23:
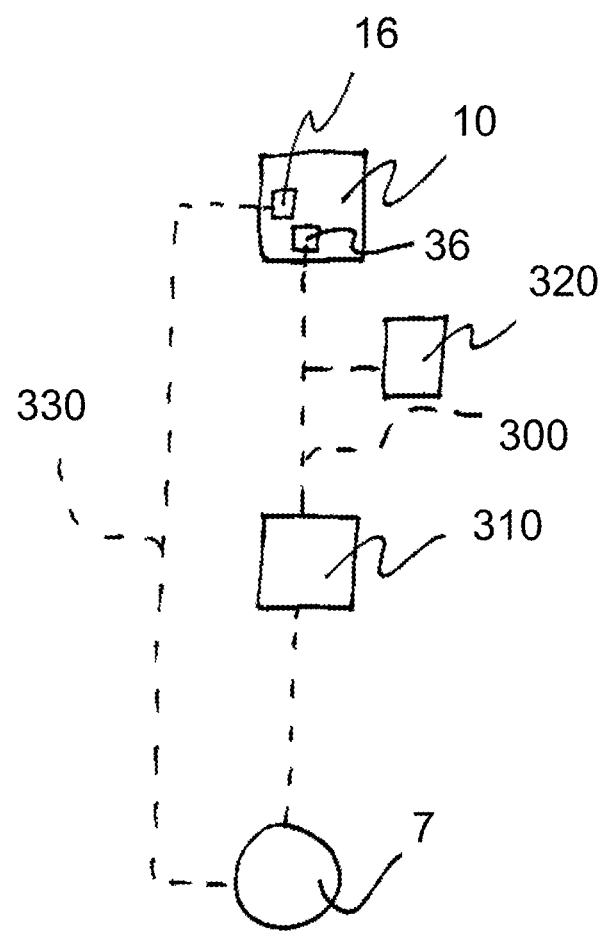
FIG. 23 is a schematic circuit diagram of a coupling valve of a compressor assembly, according to one embodiment of the invention.

FIG. 23 shows an exemplary variant of the triggering of the coupling device 36. The coupling device can, however, also be actuated electrically, electromagnetically, or electromechanically. To this end, electrical energy can be supplied from the main battery of the vehicle—or from a generator that is provided therein or from another energy source—to the hub side via sliding contacts.

It is also conceivable, however, to position a generator on the hub side, which produces electrical energy from the rotary relative movement between the hub side and the wheel mount side. It is also conceivable to position rechargeable batteries on the hub side, particularly in the spokes of the rim 1.

The compressor assembly 10, in particular its coupling device 36, is connected to the tire cavity 7 via a coupling pressure fluid line 300. A coupling valve 310 is provided in the coupling pressure fluid line 300. A relief valve 320 is also provided in the coupling pressure fluid line 300. The compression chambers 16 of the compressor assembly 10 are connected to the tire cavity 7 via a pressure fluid line 330 provided as a supply.

The coupling valve 310 is contacted by the pressure fluid of the tire cavity 7 at the pressure prevailing in the tire. When the tire pressure falls below a threshold, the coupling valve 310 opens, as a result of which the coupling device 36 is actuated by means of pressure fluid from the tire cavity 7 and the hub-side transmission part 24 is brought into cooperation with the wheel mount-side transmission part 26.

If the vehicle is currently being driven, a rotary relative movement takes place between the hub side and the wheel mount side so that pressure fluid from the compression chambers 16 is conveyed to the tire cavity 7 via the pressure fluid line 330 provided as a supply.

The coupling pressure fluid line 300 and the pressure fluid line 330 provided as a supply can also be embodied together in the form of a single line.

When a tire pressure set point that preferably lies above a tire pressure threshold is exceeded, the coupling valve 310 closes, which interrupts the action of the pressure fluid on the coupling device 36. Preferably, the coupling device 36 is evacuated by means of the coupling valve 310 or a relief valve 320 when the tire pressure set point is exceeded. This ensures that the compressor assembly 10 stops operating immediately once a pressure fluid threshold in the tire cavity 7 is reached.

This operating mode of the coupling device 36 can be combined with all of the embodiments and with individual aspects of these embodiments of the compressor assembly 10 of this application.

Figure 24:
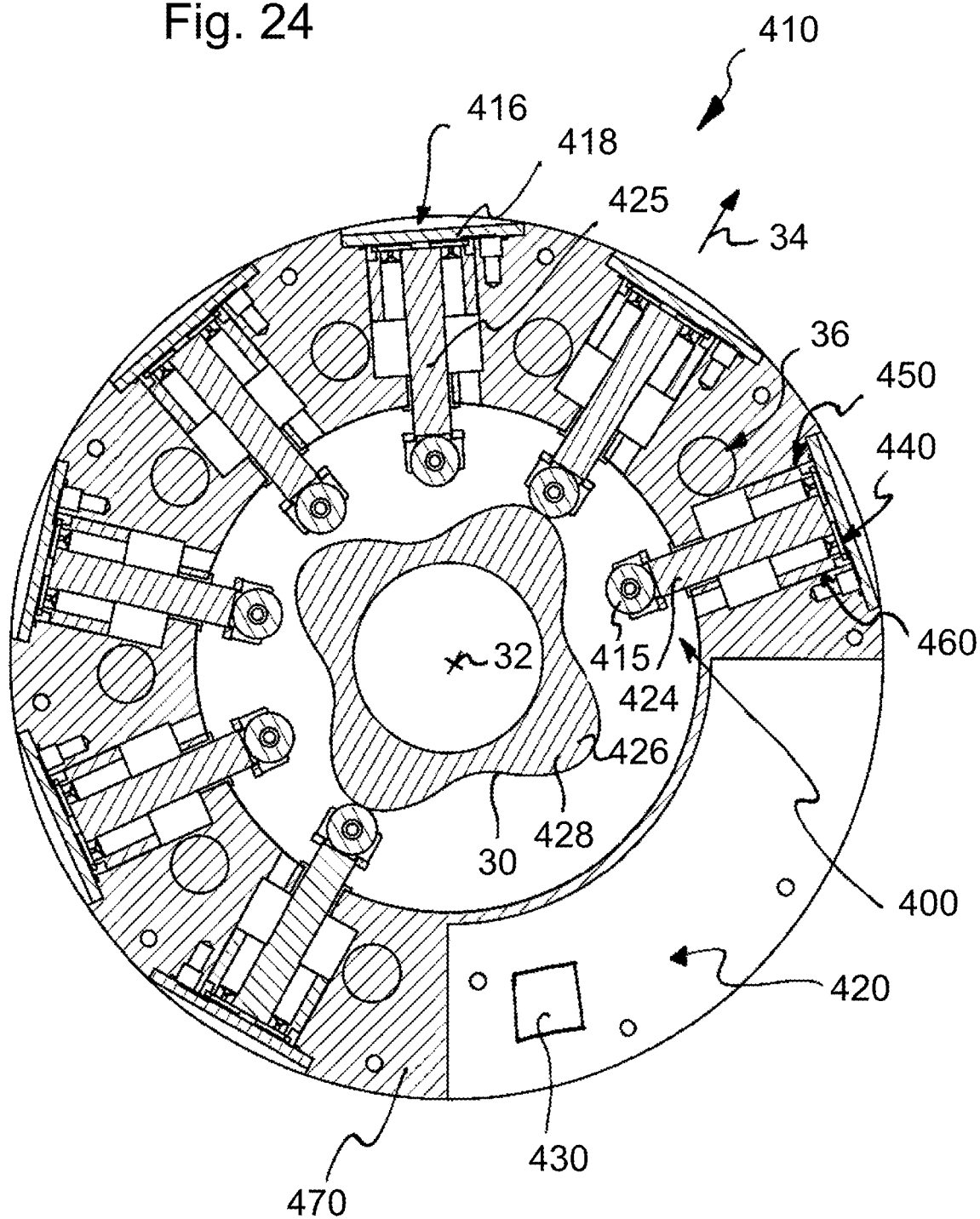
FIG. 24 shows another embodiment of a compressor assembly according to the invention.

FIG. 24 shows another embodiment of a compressor assembly 410 similar to the embodiment in FIGS. 2 to 11. The hub-side transmission parts 424 in this case are embodied in the form of roller tappets 400. At the end of plunger output elements 425 oriented toward the wheel mount-side transmission part 426, they each have a self-lubricating roller 415.

Flutter valves 440 are positioned on the respective compressor components 418. The compressor components 418 are also equipped with double seals 450, which each define a lubricant reservoir 460 of the compressor component 418 and at the same time, seal the compression chamber 416 relative to the compressor component 418.

The compressor assembly 410 also comprises a region 420, which serves, for example, to accommodate the control unit 210, the filter 200, the coupling valve 310, or the relief valve 320. In addition, an energy source 430 can be positioned therein, which can be embodied, for example, in the form of a rechargeable battery or also in the form of a pressure reservoir.

A hub-side part 470 of the compressor assembly 410 is embodied as largely annular and in the present case, comprises all of the parts of the compressor assembly 410 shown in FIG. 24 except for the wheel mount-side transmission part 426.

Figure 25:
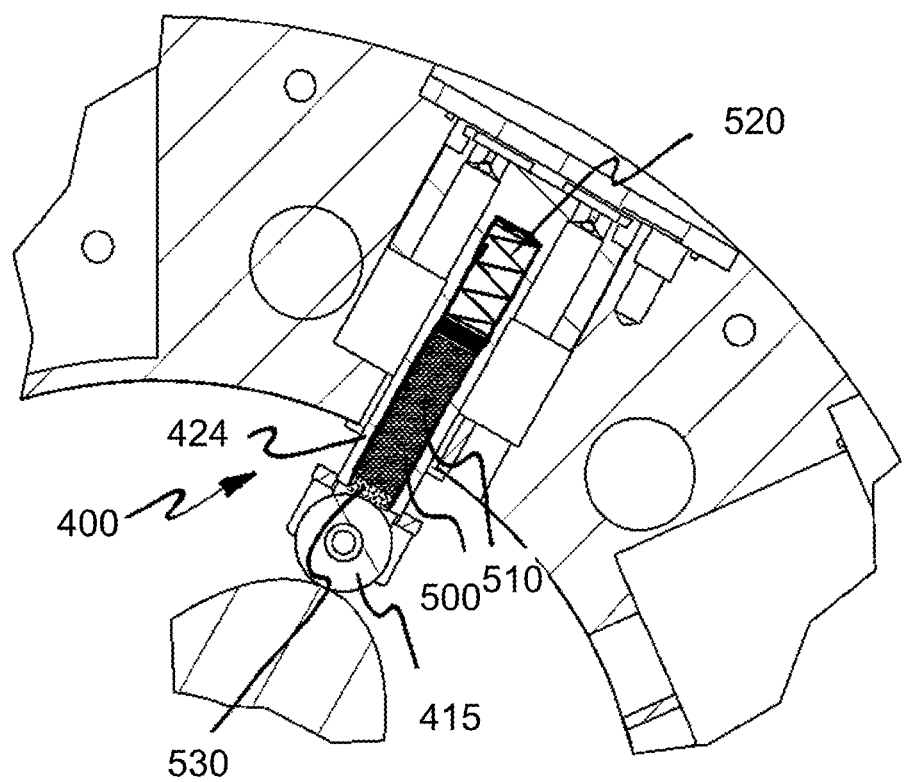
FIG. 25 is a detailed depiction of a subregion from FIG. 24.

One of the roller tappets 400 from FIG. 24 is shown in detail in FIG. 25. The roller tappet 400, as already mentioned above, is embodied as self-lubricating. The roller tappet 400 has a lubricant reservoir 500. The lubricant reservoir 500 is positioned inside the shaft of the roller tappet 400. The lubricant reservoir contains a lubricant 510, which is pre-stressed in the direction of the roller 410 by means of a spring 520. A leak prevention element 530 is provided at the roller end of the lubricant reservoir 500. The leak prevention element 530 is embodied in such a way that even when the lubricant 510 heats up, only the quantity required for the lubrication is ever dispensed.

FIGS. 26 to 31 show another embodiment of a compressor assembly 610, which, similarly to the embodiment in FIGS. 12 to 21, has a wheel mount-side transmission part 626, which, viewed from the axis of rotation 32, is situated radially outside of the hub-side part, in particular outside of the hub-side transmission parts 624, of the compressor assembly 610.

In the embodiment shown in FIGS. 26 to 31 the wheel mount-side transmission part 626 is likewise embodied as a cam disk 628. The cam disk 628 is embodied with an internal cam contour 658. The contact points 650 of the hub-side transmission parts 624 with the internal cam contour 658 are positioned in such a way that in the radial direction, a respective linear guide 652 of the hub-side transmission parts 624 is respectively situated between the contact point 650 and the axis of rotation 32.

In the working mode position shown in FIGS. 26 to 31, the hub-side transmission parts 624 cooperate with the wheel mount-side transmission part 626. Through the cooperation of the transmission parts 624 and 626, the compressor components 618 are set into an oscillating translatory movement by means of which pressure fluid can be fed from the compression chambers 616 to the tire cavity 7.

Figure 29:
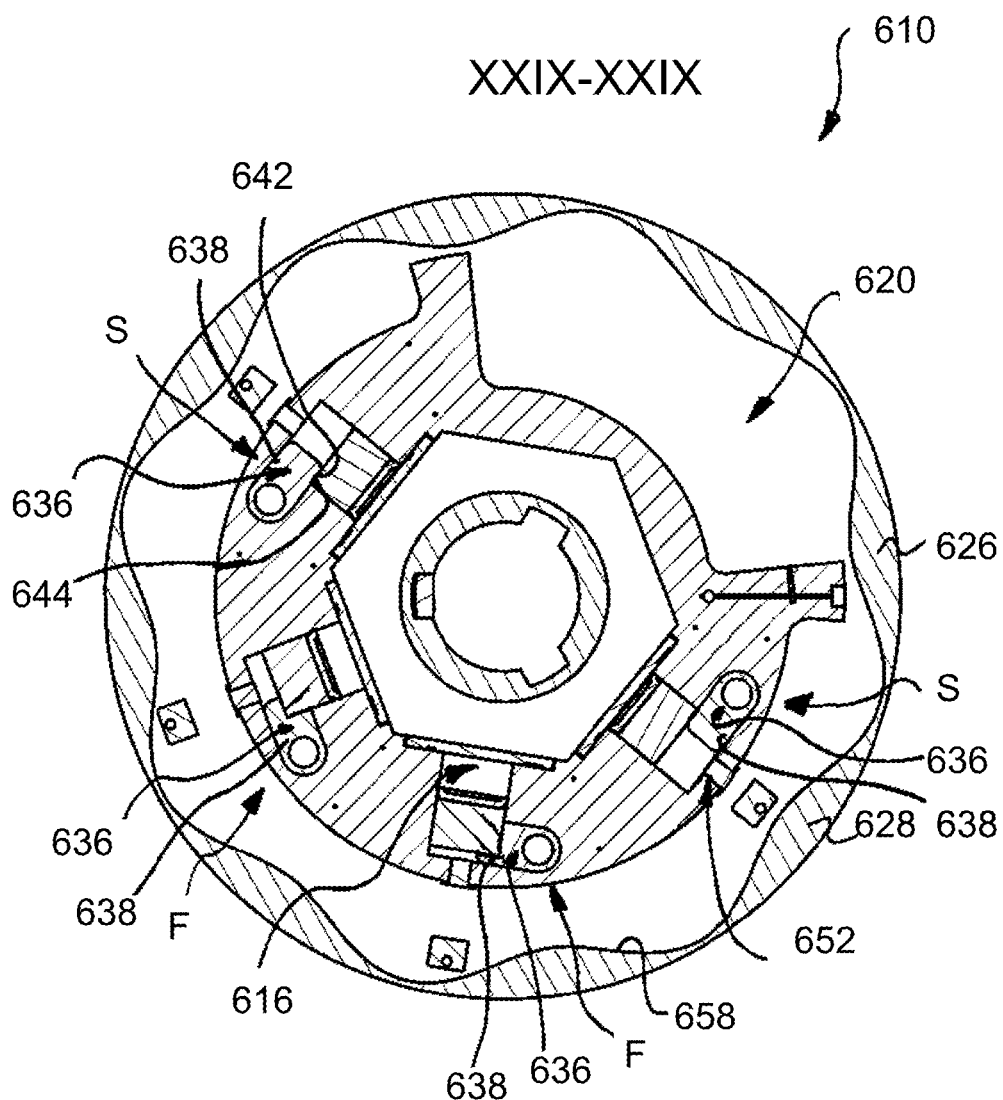

In FIG. 29, some of the coupling elements 638 are shown in the locked position and some are shown in the release position. The coupling elements 638 in the locked position are identified by arrows labeled with the reference letter S. The coupling elements 638 in the release position are identified by arrows labeled with the reference letter F.

In the locked position, the coupling elements 638 respectively engage behind the hub-side transmission parts 624 in a form-fitting manner in such a way that the hub-side transmission parts 624 are prevented from cooperating with the wheel mount-side transmission part 626. In this case, in the embodiment in FIGS. 26 to 31, a deadbolt-like locking section 642 rests against the stop section 644 of the hub-side transmission parts 624.

In order to be switched into the release position, the coupling elements 38 are moved in the direction toward the axis of rotation 32 by being acted on with pressure fluid. The coupling elements 638 are prestressed in such a way that when they are no longer being acted on with pressure fluid, they switch into the locked position.

The hub-side transmission parts 624 are embodied as roller tappets 600. At their end oriented toward the wheel mount-side transmission part 626, they each have a self-lubricating roller 615, as has already been described in detail with regard to FIG. 25.

Figure 28:
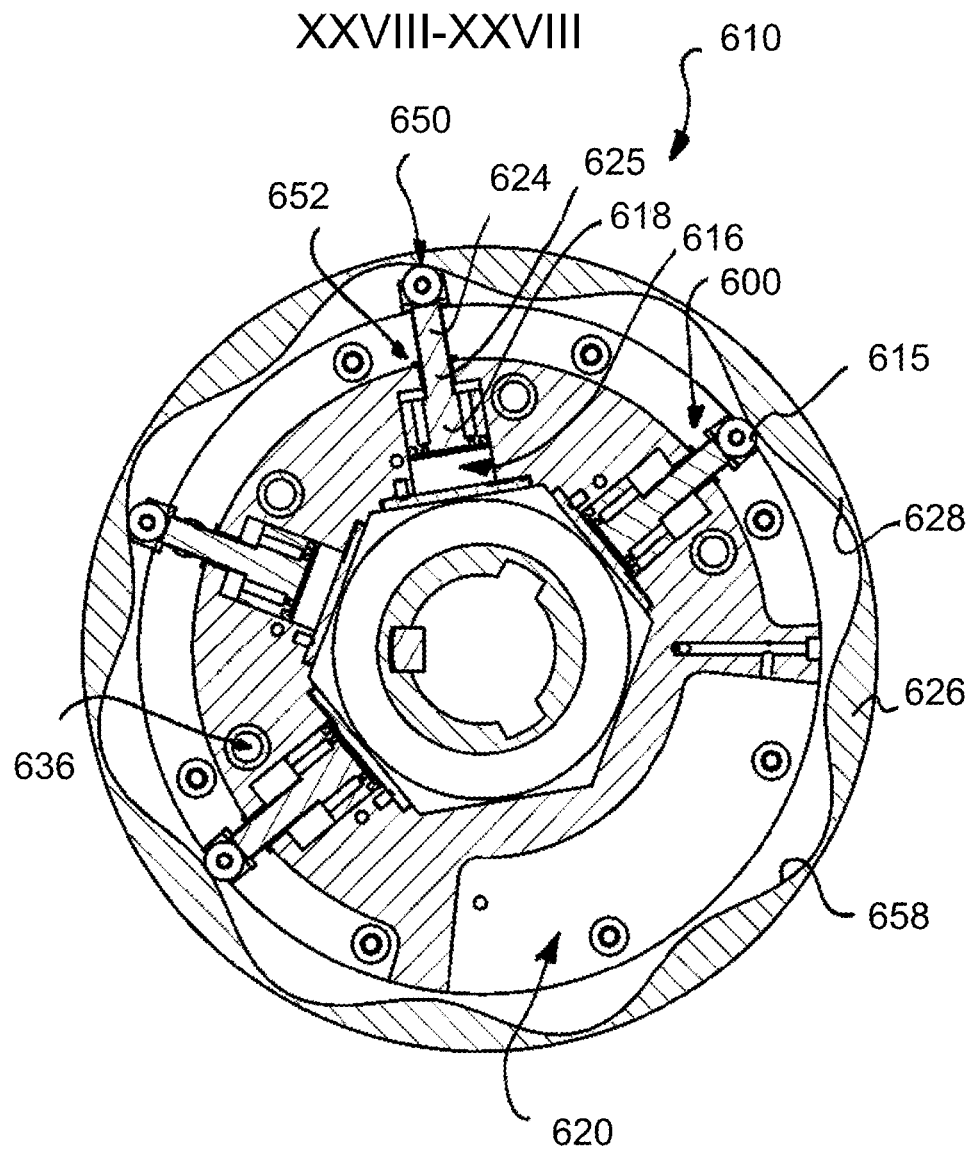
FIGS. 28-30 are each sectional views of the compressor assembly of FIG. 26.

In FIG. 28, the compressor assembly 610 is shown in a sectional view cutting along the line XXVIII-XXVIII.

In FIG. 29, the compressor assembly 610 is shown in a sectional view cutting along the line XXIX-XXIX.

Figure 30:
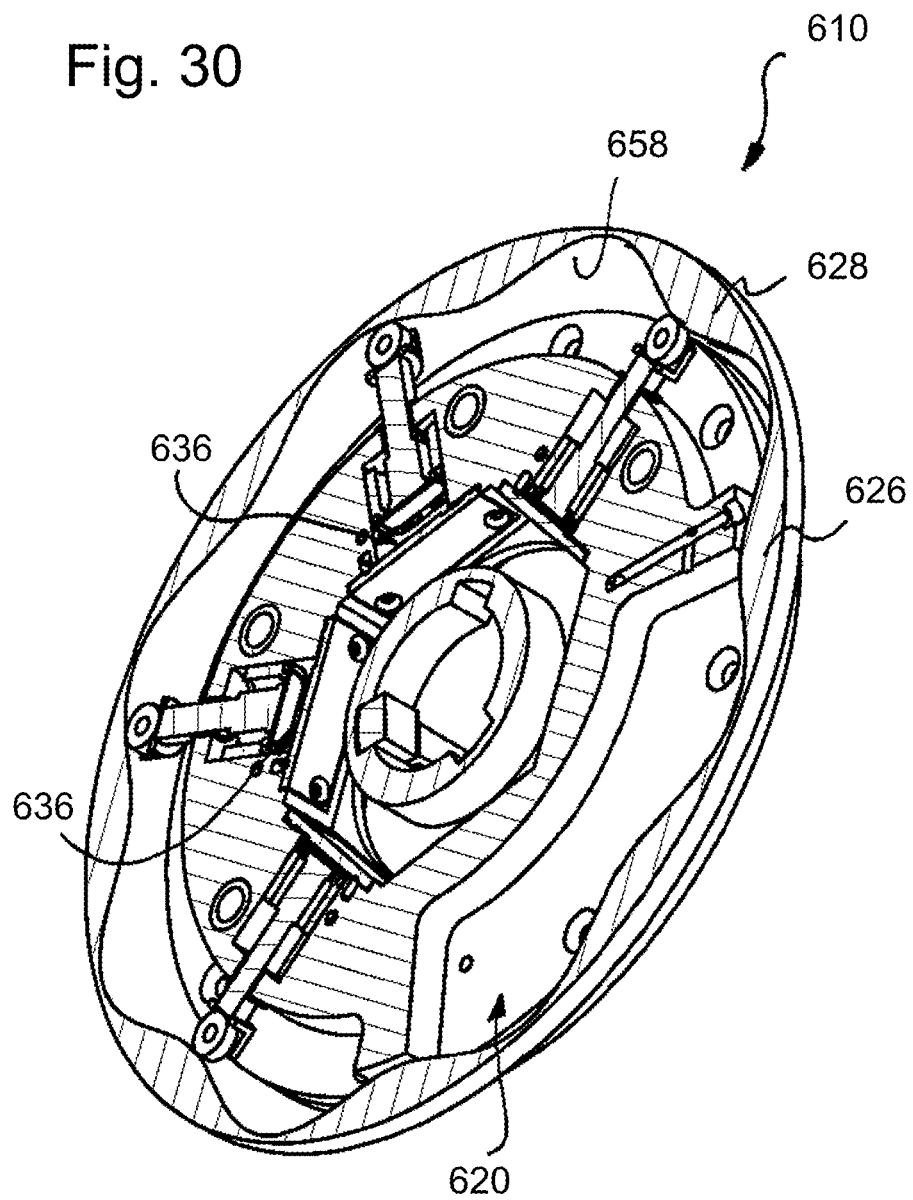

In FIG. 30, the sectional view from FIG. 29 is shown in a perspective depiction.

Figure 26:
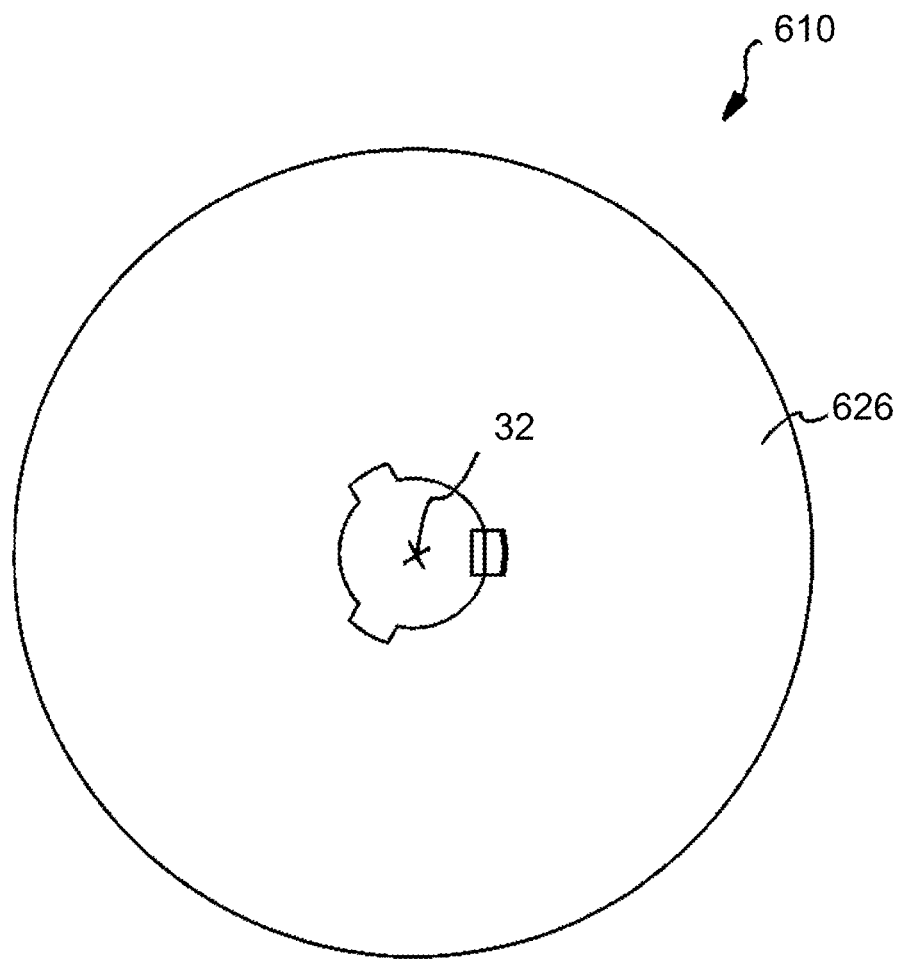
FIG. 26 shows a compressor assembly according to one embodiment of the invention.
Figure 27:
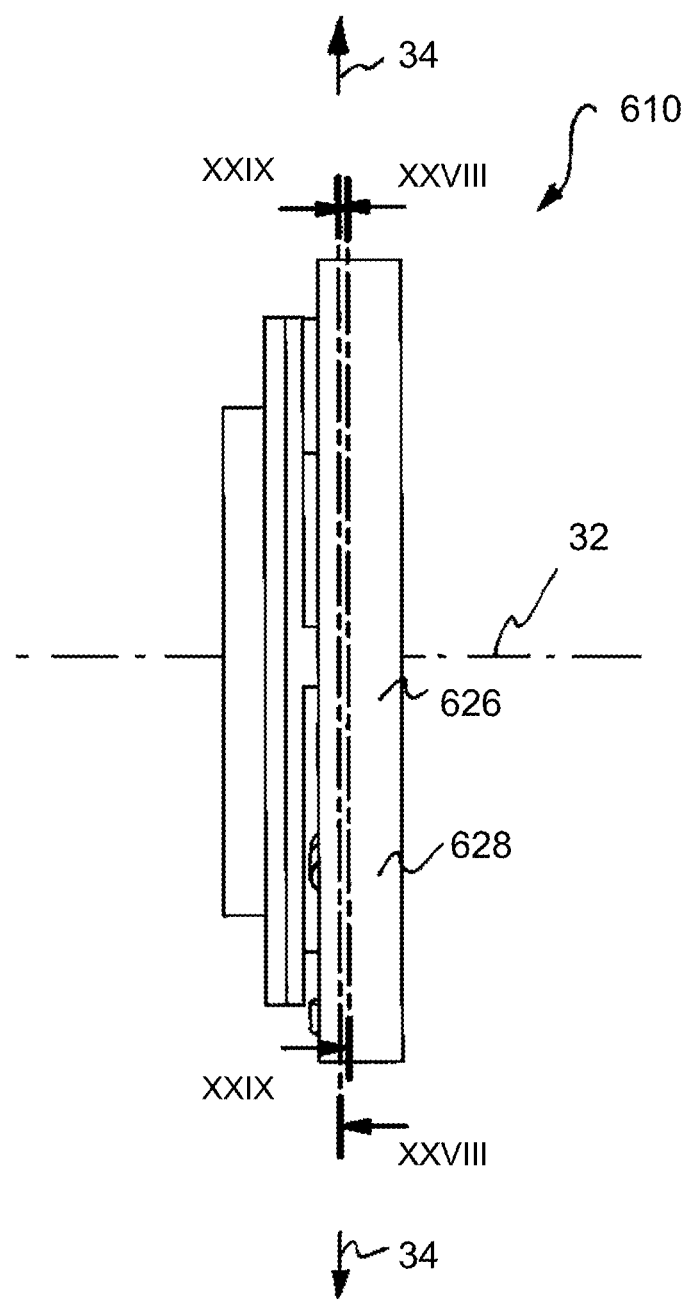
FIG. 27 is an end view of the compressor assembly of FIG. 26.
Figure 31:
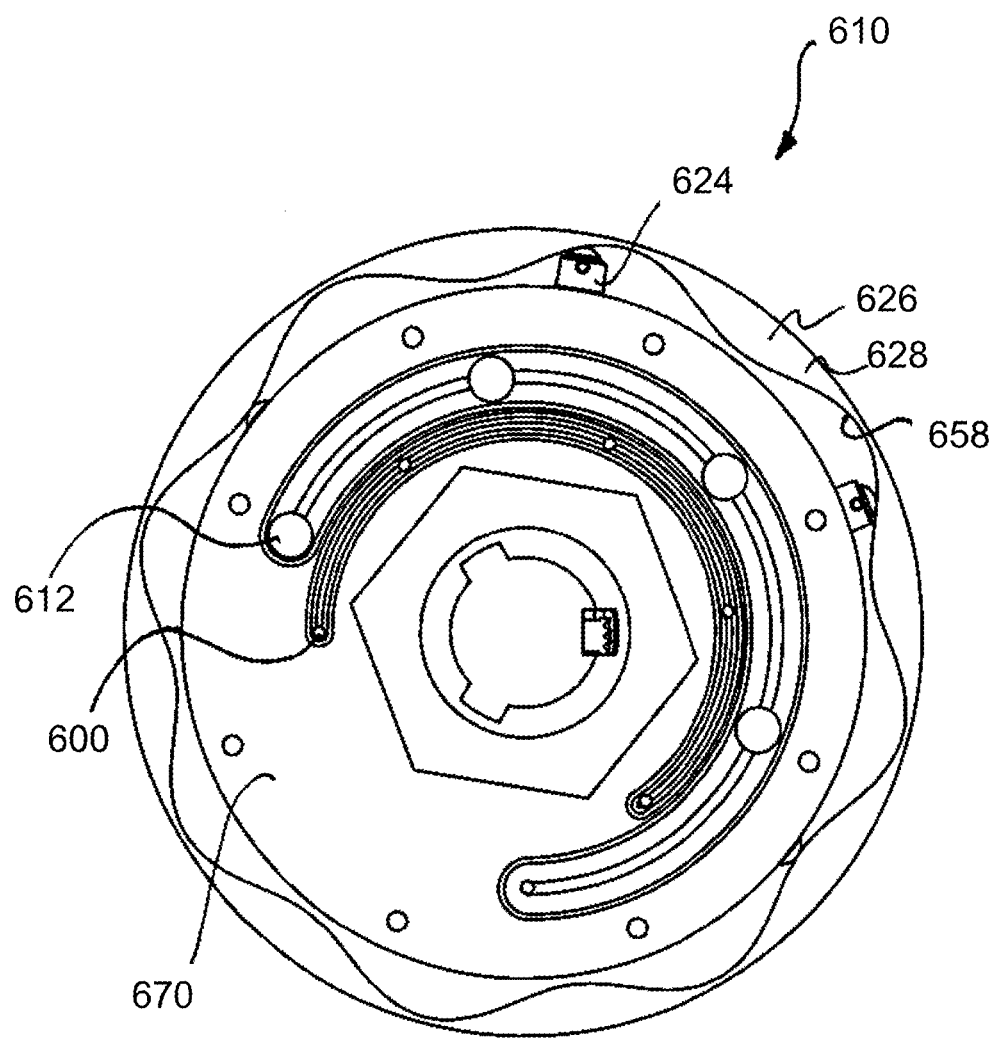
FIG. 31 is a opposite side view of the compressor assembly of FIG. 26.

In FIG. 31, the compressor assembly 610 is shown in a view that corresponds to the one shown in FIG. 26, but seen from the opposite side. On the hub-side part 670, pressure fluid outlets 600 are visible via which pressure fluid that has been pressurized by the compressor assembly 610 is conveyed to the tire cavity 7. On the hub-side part 670, pressure fluid inlets 612 are also visible, which can be connected to the coupling valve 310 so that pressure fluid can be fed from the coupling valve 310 to the via the pressure fluid inlets 612 to the coupling device 636.

The invention claimed is:

1. A compressor assembly (10) for supplying pressure fluid to a tire cavity (7) of a tire of a vehicle wheel that can be mounted on a wheel hub (4), the wheel hub (4) being mounted on a wheel mount (3) to rotate around an axis of rotation (32), the compressor assembly (10) comprising:
    at least one hub-side compression chamber (16) including a volume that changes through a translatory movement of a compressor component (18);
    a pressure fluid configured to be conveyed into the tire cavity and pressurized through a volume reduction of the compression chamber (16); and
    a transmission (20) which is configured, through a cooperation of a wheel mount-side transmission part (26) with a hub-side transmission part (24), to convert a rotary movement between the wheel mount side and the wheel hub side into an oscillating translatory movement of the compressor component (18), wherein the translatory movement of the compressor component (18) extends at least partially in a radial direction (34) oriented orthogonally to the axis of rotation (32); and
    a coupling device (36) between the hub-side transmission part (24) and the wheel mount-side transmission part (26), wherein the coupling device (36) is pneumatically, magnetically, electrically, or electromechanically actuated, and comprises a hub-side coupling element (38) that is switched between a locked position and a release position; and the hub-side transmission part (24) cooperates with the wheel mount-side transmission part (26) when the coupling element (38) is in the release position and the hub-side transmission part (24) is prevented from cooperating with the wheel mount-side transmission part (26) when the coupling element (38) is in the locked position;
    wherein the hub-side coupling element (38) comprises a locking section (42), which in the locked position rests against a stop section (44) of the hub-side transmission part (24).

2. The compressor assembly (10) according to claim 1, wherein the wheel mount-side transmission part (26) comprises a disk cam (28) and/or a grooved disk cam and/or a beaded disk cam.

3. The compressor assembly (10) according to claim 1, wherein the hub-side transmission part (24) comprises a plunger output element (25).

4. The compressor assembly (10) according to claim 3, wherein the plunger output element (25) is driven by an inner contour of a disk cam (28).

5. The compressor assembly (10) according to claim 3, wherein the plunger output element (25) is driven by an outer contour (30) of a disk cam (28).

6. The compressor assembly (10) according to claim 5, wherein a hub-side transmission part of the compressor assembly (10) is annular.

7. The compressor assembly (10) according to claim 5, wherein the hub-side transmission part (24) comprises a roller tappet.

8. The compressor assembly (10) according to claim 7, wherein the roller tappet is self-lubricating, and comprises a lubricant reservoir (500) in a shaft of the roller tappet.

9. The compressor assembly (10) according to claim 8, wherein lubricant (510) in the lubricant reservoir (500) is prestressed in the direction of a roller of the roller tappet by a prestressing device (520).

10. The compressor assembly (10) according to claim 8, wherein the lubricant reservoir (500) comprises a leak prevention element (530) at an end of the roller.

11. The compressor assembly (10) according to claim 3, wherein when viewed in the radial direction (34), the plunger output element (25) has a linear guide (52) situated between the axis of rotation (32) and a contact point (50) with the disk cam (28), the grooved disk cam, and/or the beaded disk cam.

12. The compressor assembly (10) according claim 11, wherein when viewed in the radial direction (34), the contact point (50) of the plunger output element (25) with the disk cam (28), the grooved disk cam, and/or the beaded disk cam lies between the axis of rotation (32) and the linear guide (52) of the plunger output element (25).

13. The compressor assembly (10) according to claim 1, wherein the compressor component (18) is one piece with the hub-side transmission part (24).

14. The compressor assembly (10) according to claim 1, wherein the hub-side coupling element (38) is prestressed into the locked position, particularly by means of a spring (49).

15. The compressor assembly (10) according to claim 1, wherein the hub-side transmission part (24) is prestressed into a position in which it cooperates with the wheel mount-side transmission part (26).

16. The compressor assembly (10) according to claim 1, wherein the hub-side coupling element (38), when switching into the locked position, pushes the hub-side transmission part (24) into a position that, regardless of the position of the wheel mount-side transmission part (26), has no direct contact with the wheel mount-side transmission part (26).

17. The compressor assembly (10) according to claim 1, wherein the locking section (42) of the hub-side coupling element (38) transitions into a release section (46) of the hub-side coupling element (38) and viewed in the direction of the translatory movement of the compressor component (18), the release section (46) is positioned offset from the locking section (42).

18. The compressor assembly (10) according to claim 1, wherein the coupling device (36) is actuated by pressure fluid from the tire cavity (7) supplied via a pressure line (6, 300, 330), and the coupling element (38) is switched from the locked position into the release position by means of pressure fluid from the tire cavity (7).

19. The compressor assembly (10) according to claim 1, further comprising a coupling valve (310) disposed fluidically between the coupling device (36) and the tire cavity, which is contacted by the pressure fluid from the tire cavity (7) and opens when the tire pressure falls below a threshold, as a result of which the coupling device (36) is actuated by the pressure fluid from the tire cavity (7) and the hub-side transmission part (24) is brought into cooperation with the wheel mount-side transmission part (26).

20. The compressor assembly (10) according to claim 19, wherein the coupling valve (310) closes when a tire pressure set point above a tire pressure threshold is exceeded, which interrupts an action of the pressure fluid on the coupling device (36).

21. The compressor assembly (10) according to claim 1, further comprising multiple compressor components (18) distributed uniformly in a circumference direction around the axis of rotation (32).

22. The compressor assembly (10) according to claim 1, further comprising a flutter valve (440) on the compressor component (18).

23. The compressor assembly (10) according to claim 22, wherein the compressor component (18) comprises a double seal (450) defining a lubricant reservoir (460) of the compressor component (18) and sealing the compression chamber (16) relative to the compressor component (18).

24. The compressor assembly (10) according to claim 23, wherein the flutter valve (440) is one piece with at least a part of the double seal (450).

25. The compressor assembly (10) according to claim 1, further comprising a device (210) for measuring and/or displaying pressure, temperature, and/or humidity of the pressure fluid in the tire cavity (7) and connected to the tire cavity (7) via the pressure fluid line (6).

26. The compressor assembly (10) according to claim 1, further comprising a filter (200) on a pressure fluid inlet side.

27. The compressor assembly (10) according to claim 26, wherein the filter is cleaned by the pressure fluid from the tire cavity (7) or supplied by the compressor assembly (10).

* * * * *